US012791851B2

(12) United States Patent
Pretorius et al.

(10) Patent No.: US 12,791,851 B2
(45) Date of Patent: Nov. 10, 2026

(54) WAVEFRONT MANIPULATOR AND OPTICAL DEVICE

(71) Applicant: Carl Zeiss AG, Oberkochen (DE)

(72) Inventors: Marco Pretorius, Oberkochen (DE); Markus Seesselberg, Oberkochen (DE)

(73) Assignee: Carl Zeiss AG, Oberkochen (DE)

( * ) Notice: Subject to any disclaimer, the term of this patent is extended or adjusted under 35 U.S.C. 154(b) by 239 days.

(21) Appl. No.: 18/684,113

(22) PCT Filed: Aug. 10, 2022

(86) PCT No.: PCT/EP2022/072431
§ 371 (c)(1),
(2) Date: Feb. 15, 2024

(87) PCT Pub. No.: WO2023/020910
PCT Pub. Date: Feb. 23, 2023

(65) Prior Publication Data

US 2024/0353671 A1 Oct. 24, 2024

(30) Foreign Application Priority Data

Aug. 19, 2021 (DE) ..................... 10 2021 121 561.7

(51) Int. Cl.
*G02B 26/08* (2006.01)
*G02B 3/00* (2006.01)
(Continued)

(52) U.S. Cl.
CPC ....... *G02B 26/0875* (2013.01); *G02B 3/0087* (2013.01); *G02B 3/02* (2013.01); *G02B 7/04* (2013.01); *G02B 27/0068* (2013.01)

(58) Field of Classification Search
None
See application file for complete search history.

(56) References Cited

U.S. PATENT DOCUMENTS 3,305,294 A * 2/1967 Alvarez ................. G02C 7/081
359/708
4,925,281 A * 5/1990 Baker ...................... G02B 7/10
359/708

(Continued)

FOREIGN PATENT DOCUMENTS

DE 102013100680 A1 7/2014
DE 102015119255 A1 5/2017

(Continued)

OTHER PUBLICATIONS

A. Palusinski et al., Lateral-shift variable aberration generators, Applied Optics, vol. 38 (1999) S. 86-90, Jan. 1, 1999, 5 pages.

(Continued)

*Primary Examiner* — Robert E. Tallman
(74) *Attorney, Agent, or Firm* — Skaar Ulbrich Macari, P.A.

(57) ABSTRACT

A wavefront manipulator has at least a first optical component and a second optical component arranged in succession along a reference axis. The first optical component and the second optical component are arranged so as to be movable relative to one another perpendicular to the reference axis. The first optical component and the second optical component each include a first optical element and at least one further optical element with differing refractive index profiles $\eta_1(\lambda)$ and $\eta_i(\lambda)$ arranged in succession along the reference axis, with the optical elements having, in relation to local coordinates x and y of the optical components, a spatially dependent length $\Delta z(x,y)$ in the z-direction parallel to the reference axis.

14 Claims, 17 Drawing Sheets

(51) Int. Cl.

| | |
|---|---|
| ***G02B 3/02*** | (2006.01) |
| ***G02B 7/04*** | (2021.01) |
| ***G02B 27/00*** | (2006.01) |

(56) References Cited

U.S. PATENT DOCUMENTS

| | | | | |
|---|---|---|---|---|
| 9,335,446 | B2 * | 5/2016 | Crosby | G02B 3/0081 |
| 10,082,652 | B2 | 9/2018 | Zhou et al. | |
| 10,746,975 | B2 | 8/2020 | Pretorius et al. | |
| 11,465,375 | B2 * | 10/2022 | Williams | B29D 11/00355 |
| 2012/0257278 | A1 * | 10/2012 | Simonov | G11B 7/13927<br>359/557 |
| 2014/0285905 | A1 * | 9/2014 | Zhou | G02B 7/10<br>359/696 |
| 2016/0131900 | A1 * | 5/2016 | Pretorius | G02B 13/0095<br>359/368 |
| 2023/0091357 | A1 * | 3/2023 | Fein | G02B 25/001<br>359/643 |
| 2023/0339198 | A1 * | 10/2023 | Williams | B29D 11/00355 |

FOREIGN PATENT DOCUMENTS

| | | | |
|---|---|---|---|
| WO | 2013079312 | A1 | 6/2013 |
| WO | 2013120800 | A1 | 8/2013 |
| WO | 2015110916 | A1 | 7/2015 |

OTHER PUBLICATIONS

Yongchao Zou et al., Miniature tunable multi-element Alvarez lenses, 2014 International Conference on Optical Mems and Nanophotonics (OMN), IEEE, doi:10.1109/OMN.2014.6924520, ISSN 2160-5033, ISBN 978-1-4577-1511-2, (Aug. 17, 2014), pp. 23-24, (Oct. 14, 2014), XP032658420, 2014, 2 pages.

A.W. Lohmann, A New Class of Varifocal Lenses, Applied Optics, vol. 9, No. 7, Jul. 1970, 3 pages.

The International Search Report rendered by the International Searching Authority for PCT/EP2022/072431, dated Dec. 14, 2022, 2 pages.

The Written Opinion rendered by the International Searching Authority for PCT/EP2022/072431, dated Dec. 14, 2022, 7 pages.

* cited by examiner

WAVEFRONT MANIPULATOR AND OPTICAL DEVICE

PRIORITY

This application claims the benefit of German Patent Application No. 10 2021 121 561.7, filed on Aug. 19, 2021, which is hereby incorporated herein by reference in its entirety.

FIELD

The present invention relates to a wavefront manipulator having at least a first optical component and a second optical component which are arranged in succession along a reference axis, with the first optical component and the second optical component being arranged so as to be movable relative to one another perpendicular to the reference axis. Additionally, the invention relates to a use of the wavefront manipulator and to an optical device having a wavefront manipulator.

BACKGROUND

U.S. Pat. No. 3,305,294 A1 by Luiz W. Alvarez describes optical elements with at least a first optical component and a second optical component which are arranged in succession along an optical axis, each have a refractive free-form surface, and are displaceable with respect to one another perpendicular to the optical axis. The refractive power effect of an optical element made up of the two component parts can be varied by lateral displacement of the optical component with the free-form surfaces. Such optical elements are therefore also called Alvarez elements or zoom lenses. A variable refractive power corresponds to a variable focal position, which is describable by a change in the parabolic component of the wavefront of a beam that is incident parallel to the axis. In this sense, a zoom lens can be viewed as a special wavefront manipulator.

Document U.S. Pat. No. 10,082,652 B2 discloses a zoom optical unit based on a plurality of wavefront manipulators, the wavefront manipulators consisting of Alvarez elements. This allows realization of zoom objectives for a miniaturized camera, which for example can find use in a compact mobile handheld device such as a smartphone or laptop.

The article I. A. Palusinski et al., Lateral-shift variable aberration generators, Applied Optics Vol. 38 (1999) pp. 86-90 [1] has disclosed a variable monochromatic wavefront manipulator for a wavelength $\lambda_0$, which consists of two structurally identical plates made of a material with a refractive index profile $n(\lambda)$ and each having a free-form surface, the surface shape of which is described by a surface function $T(x, y)$. Both plates can be moved by different displacement paths a perpendicular to the z-axis in the x- and/or y-direction, with the z-axis representing the optical axis. There is a description of various surface functions $T(x,y)$, which are suitable for impressing different wavefront deformations $W_{\alpha,\lambda}(x,y)$ on an incident light wave. Thus, deformations such as tilt, defocus, astigmatism, coma, spherical aberration, etc. can be impressed on an incident wavefront.

The document WO 2013/079312 A1 describes a polychromatic wavefront manipulator with the same basic structure as the wavefront manipulators from citation [1], wherein the manipulator can be used in a wavelength range $\lambda_{min}<\lambda<\lambda_{max}$, and a diffractive optical element (DOE) is used for color correction. The groove profiles of the DOE are now chosen in such a way that the above-described dependence of the wavefront deformation $W_{\alpha,\lambda}(x, y)$ on the wavelength $\lambda$ is compensated for. In this way, it is possible to correct a longitudinal chromatic aberration, for example.

The document WO 2013/120800 A1 describes a polychromatic wavefront manipulator with the same basic structure as the wavefront manipulators from citation [1], wherein, however, a liquid is used between the plates rather than air. In one variant, the refractive index profile of this liquid is matched to the refractive index profile of the plate material $n(\lambda)$ in such a way that the dependence of the wavefront deformation $W_\alpha(x, y)$ on the refractive index $n(\lambda)$, and hence on the wavelength A, is compensated for by the liquid. In this way, it is possible to correct a longitudinal chromatic aberration, for example. In another variant, the wavefront manipulator is designed not to bring about a wavefront deformation at a fixedly predefined fundamental wavelength, but only at the secondary wavelengths. Thus, only a chromatic (=wavelength-dependent) change is brought about in a wavefront term. In this case, the refractive index profile of the immersion liquid is adapted such that it corresponds as exactly as possible to that of the plate material for the fundamental wavelength and has a defined deviation only for the secondary wavelengths.

Document DE 10 2015 119 255 A1, paragraph [0044] has described an adjustable phase mask consisting of two phase plates which may consist of a plurality of materials such that a path difference and a phase shift are obtained independently of the wavelength, said path difference and phase shift being the same apart from integer multiples of the wavelength and integer multiples of $2\pi$, respectively.

In the zoom optical units with a wavefront manipulator according to U.S. Pat. No. 10,082,652 B2, the employed wavefront manipulators consist of plates made of only one material, which has a wavelength-dependent refractive index $n(\lambda)$. It is hence clear that the wavefront deformations $W_{\alpha,\lambda}(x,y)$ have a significant dependence on the wavelength, and this becomes noticeable in the zoom optical units as a longitudinal chromatic aberration and as a transverse chromatic aberration. This therefore significantly limits the imaging quality of these zoom optical units. Then again, it has proven impossible to realize wavefront manipulators according to U.S. Pat. No. 10,082,652 B2 in which the wavefront deformation $W_{\alpha,\lambda}(x,y)$ has a particularly large dependence on the wavelength $\lambda$. For example, this may be useful for the compensation of chromatic aberrations of other optical components. Thus, the use of only one material on one plate of the wavefront manipulator significantly restricts the applicability of the zoom concept to cameras which require a good imaging performance over an entire spectrum.

For polychromatic optical systems, the monochromatic wavefront manipulator according to citation [1] generates a wavefront deformation $W_{\alpha,\lambda}(x, y)$ that is dependent on the wavelength $\lambda$ in the wavelength range $\Delta_{min}<\lambda<\lambda_{max}$ and specified by the refractive index profile $n(\lambda)$. This dependence leads to unwanted chromatic aberrations in most spectrally broadband applications, with the result that the wavefront manipulator cannot be used there.

The polychromatic wavefront manipulator according to WO 2013/079312 A1 is disadvantageous in that the employed DOEs have stray light from unwanted orders of diffraction. Although this stray light can be reduced by the use of what are known as “efficiency achromatized DOEs” (EA-DOEs), it cannot be made to vanish. In particular, EA-DOEs have tolerance-induced stray light. Consequently, the use of polychromatic wavefront manipulators according to WO 2013/079312 A1 is precluded in the case of stray light-sensitive applications such as all types of cameras, microscopes, binoculars, spotting scopes, etc.

The polychromatic wavefront manipulator according to WO 2013/120800 A1 is disadvantageous in that there is a liquid between the plates. The refractive index profile of the liquid and its transparency should not change during the service life of the product, with the result that corresponding demands are to be placed on the liquid. Further, the manipulator should be operated only in a temperature range in which the liquid remains in the liquid state of matter. To prevent the liquid from leaking during the service life of the product, it is necessary to put in much constructional effort, leading to costs and increased installation space requirements. These reasons restrict the use of polychromatic wavefront manipulators according to WO 2013/120800 A1.

Document DE 10 2015 119 255 A1 focuses on the disclosure the phase plates that are twisted relative to one another. According to paragraph [0064], such elements are suitable for phase contrast microscopy, in particular. The exemplary embodiments are therefore restricted to phase rings or to the generation of wavefront deformations $W_{\alpha,\lambda}(x, y)$, which are not dependent on the spatial coordinates x and y.

SUMMARY

An object herein is to provide an advantageous wavefront manipulator having at least a first optical component and a second optical component which are arranged in succession along a reference axis and can be moved relative to one another perpendicular to the reference axis. Another object is to provide an advantageous optical device. A further object is to specify an advantageous use for the wavefront manipulator.

A wavefront manipulator in certain example embodiments comprises at least a first optical component and a second optical component. The first optical component and the second optical component are arranged in succession along a reference axis. Furthermore, the first optical component and the second optical component are arranged so as to be movable relative to one another in a movement direction perpendicular to the reference axis. In this case, either the first optical component or the second optical component may be arranged so as to be movable in relation to the respective other optical component. It is preferable for both optical components to be arranged so as to be movable in at least one movement direction in a plane perpendicular to the reference axis.

In the present context, the reference axis is understood to mean an axis, for example a z-axis of a Cartesian or cylindrical coordinate system, in respect of which the deformation of the wavefront profiles caused by the wavefront manipulator is defined. In other words, the reference axis is the axis in respect of which the deformation of the wavefront profiles provided for by the wavefront manipulator is implemented. In particular, the reference axis may run parallel to a normal of a plane in which the first optical component and the second optical component are movable relative to one another. The reference axis may run parallel to an optical axis or coincide with the latter, said optical axis being defined by a rotationally symmetric optical unit comprising the wavefront manipulator. The reference axis may also be aligned relative to a reference axis of an optical structure in which the wavefront manipulator is used. In this case, a reference axis of the optical structure may be chosen such that it corresponds to an optical axis.

The first optical component and the second optical component each comprise a first optical element and at least one further optical element, which is to say at least two optical elements. The optical elements have differing refractive index profiles $\eta_i(\lambda)$ and $\eta_i(\lambda)$ ($\eta_i(\lambda) \neq \eta_i(\lambda)$). In this case, the index i denotes the at least one further optical element. The absolute value of the difference in the refractive index profiles $\eta_i(\lambda)$ and $\eta_i(\lambda)$ is greater than a specified limit value, for example greater than or equal to at least 0.01, preferably for at least one specified wavelength. For example, the optical elements may be constructed from materials numbered i and j, with the result that the following applies to a wavelength $\lambda_1$ with $\lambda_{min}<\lambda_1<\lambda_{max}$: $|n(\lambda_1)-\eta_j(\lambda_j)|>0.01$.

The optical elements are arranged in succession along the reference axis, preferably arranged in a manner directly connected to one another, which is to say without a distance or interspace therebetween. Advantageously, the first and the at least one further optical element have a contact surface, which is preferably designed as a free-form surface. In respect of local coordinates x and y of the optical component, the optical elements have a spatially dependent extent or thickness or length (referred to as length below) in the z-direction parallel to the reference axis $\Delta z(x,y)$. In other words, the length is not constant. Preferably, the local coordinates x and y are coordinates of a Cartesian coordinate system.

A free-form surface should be understood in the broader sense to mean a complex surface that can be represented, in particular, by means of regionally defined functions, in particular twice continuously differentiable regionally defined functions. Examples of suitable regionally defined functions are (in particular piecewise) polynomial functions (in particular polynomial splines, such as for example bicubic splines, higher-degree splines of the fourth degree or higher, or polynomial non-uniform rational B-splines (NURBS)). These should be distinguished from simple surfaces, such as for example spherical surfaces, aspherical surfaces, cylindrical surfaces, and toric surfaces, which are described as a circle, at least along a principal meridian. In particular, a free-form surface need not have axial symmetry and need not have point symmetry and can have different values for the mean surface power value in different regions of the surface.

The first optical component and the second optical component can each have at least one refractive free-form surface and/or at least one plane surface. In this case, the optical components can be arranged such that free-form surfaces of adjacent optical components face one another or such that the free-form surfaces face away from one another. On account of the free-form surfaces, the strength of the refractive power of the optical element can be modified by lateral displacement (i.e., a displacement perpendicular to the reference axis) of the two optical components relative to one another. Influencing the refractive power by way of a lateral displacement is described in document U.S. Pat. No. 3,305,294 A1, to which reference is made in this context.

Configuring the individual optical components of the wavefront manipulator with in each case at least two optical elements made of different media, which each have a spatially dependent length in the z-direction, is advantageous in that a polychromatic stray light-free wavefront manipulator made of solid materials is provided, by means of which a wavefront deformation $W_{,\lambda}(x,y)$ can be impressed on an incident light beam, where $W_{,\lambda}(x,y)$ is adjustable by a displacement path a and/or an angle of rotation $\alpha$ about an axis of rotation running parallel to the optical axis. Furthermore, it is possible to design the wavefront deformation to be virtually identical for two different wavelengths by means of the plurality of optical elements of the individual optical components, with the result that the wavefront manipulator can be configured as an achromat. Moreover, in a further possible embodiment of the wavefront manipulator, the wavelength dependence of the wavefront deformation can be designed precisely so that the various wavefront deformations for different wavelengths can be beneficially used in the overall system, in particular for correcting imaging errors. In this case, the wavefront deformation is not restricted to a defocus, but may for example also consist of an astigmatism, coma, spherical aberration, or linear combinations thereof.

Preferably, the length of the at least one further optical element $\Delta z_i(x,y)$ is not constant and linearly dependent on the length of the first optical element $\Delta z_1(x,y)$, especially according to the following formula:

$$\Delta z_i(x, y) = \gamma_{1,i} \cdot \Delta z_1(x, y) + c_i \text{ for } i = 1, 2, \ldots, k$$

Here, $k \geq 2$ denotes the number of optical elements. The i-th optical element with $1 \leq i \leq k$ then for example has a length of $\Delta z_i(x,y)$ and a refractive index of $\eta_i(\lambda)$. In the case of two optical elements, which is to say a first optical element 1 and a second optical element 2, a linear dependence arises according to the following formula:

$$\Delta z_2(x, y) = \gamma_{1,2} \cdot \Delta z_1(x, y) + c_2.$$

Here, $\gamma_{1,2}$, $c_2$, $\gamma_{1,i}$, and $c_i$ are arbitrary constants. The length $\Delta z_1(x,y)$ can be chosen freely, depending on the application. Thus, a wavefront manipulator may also comprise individual optical components, each with three or more different optical elements ($k \geq 3$). Attention is drawn here to the fact that the numbering of the media or optical elements comprising these is arbitrary; care merely needs to be taken that medium 1 has a length $\Delta z_1(x, y)$ that is dependent on the location (x, y).

In particular, the wavefront manipulator may comprise optical components with two optical elements (k=2), which is to say two media, with $\gamma_{1,2}=-1$, where the two outer surfaces of the individual optical components adjacent to air are plane surfaces.

It is advantageously true for each of the at least two optical components that, in at least 80% of all volumes $V_a$ of the respective optical component with the points (x, y, z) through which light beams pass in the case of a displacement path a for which the wavefront manipulator is designed, the following condition is satisfied for all materials i with arbitrary constants $\gamma_{1,i}$ and $c_i$:

$$\left| \frac{\Delta z_i(x, y) - \gamma_{1,i} \cdot \Delta z_1(x, y) - c_i}{\gamma_{1,i} \cdot \Delta z_1(x, y) + c_i} \right| < 0.25.$$

It is more advantageous if, in at least 90% of all volumes $V_a$, the following stricter condition is satisfied for arbitrary constants $\gamma_{1,i}$ and $c_i$:

$$\left| \frac{\Delta z_i(x, y) - \gamma_{1,i} \cdot \Delta z_1(x, y) - c_i}{\gamma_{1,i} \cdot \Delta z_1(x, y) + c_i} \right| < 0.10.$$

It is particularly advantageous if, in at least 97% of all volumes $V_a$, the following even stricter condition is satisfied for arbitrary constants $\gamma_{1,i}$ and $c_i$:

$$\left| \frac{\Delta z_i(x, y) - \gamma_{1,i} \cdot \Delta z_1(x, y) - c_i}{\gamma_{1,i} \cdot \Delta z_1(x, y) + c_i} \right| < 0.01.$$

The at least two optical components may have the same structural design in relation to their optical features, in particular the optical features of the utilized optical elements. This is advantageous in that a cost-effective production and cost-effective servicing, including possible repairs, are possible. Moreover, the Alvarez principle can be beneficially applied. For example, an appropriately configured wavefront manipulator allows realization of an Alvarez element with two optical components, in which the materials used for the optical elements differ in each component and also the lengths $\Delta z_i(x, y)$ of the optical elements of each component are different. Then, care needs to be taken that the wavefront deformations of the two components are chosen so as to fit to one another.

Furthermore, at least one of the optical components may have at least one plane outer surface which extends perpendicular to the reference axis. For example, at least one optical component of the wavefront manipulator can be configured as a plate, in particular a plane parallel plate. Particularly cost-effective wavefront manipulators are obtained if all available optical components of the wavefront manipulator are configured as plates, in particular plane parallel plates. This is connected with the further advantage of being able to minimize the distance between the optical components and realizing a robust configuration.

The optical components may be arranged so as to be movable relative to one another by translation, in other words arranged so as to be displaceable, in at least one direction perpendicular to the reference axis, which is to say in the x- and/or y-direction. As an addition or alternative, the optical components may be arranged so as to be movable relative to one another by rotation about an axis running parallel to the reference axis (z-direction), which is to say arranged so as to be rotatable. The aforementioned variants allow the use of a plurality of degrees of freedom for correcting aberrations or for realizing focusing, for example in the form of a zoom function, in very small installation space.

Advantageously, at least one, preferably two, of the optical components comprises at least two optical elements which have relative partial dispersions which differ from one another by less than a specified limit value. The specified limit value may be a value of less than 0.01, in particular less than 0.005. In this way, the wavefront manipulator can be configured as an apochromatic wavefront manipulator, which is to say it can largely correct a chromatic aberration. An apochromat (or "trichromat") generates a wavefront deformation $W_{\alpha,\lambda}(x, y)$, in which the parabolic component corresponds for three mutually different wavelengths.

In a further variant, at least one, preferably two, of the optical components may comprise at least three optical elements. In this case, at least one of the optical elements may have an anomalous relative partial dispersion. This configuration is advantageous in that the wavefront manipulator can be used as an apochromatic wavefront manipulator for focusing purposes and/or for the correction or targeted generation of astigmatism or coma.

A material with an Abbe number of $\nu_d$ has an anomalous relative partial dispersion if the absolute value of the difference $$\Delta P_{g,F} = P_{g,F} - P_{g,F}^{normal}$$

between the relative partial dispersion $P_{g,F}$ of the material and a normal relative partial dispersion $$P_{g,F}^{normal}$$

at the Abbe number $\nu_d$ of the material is at least 0.005, in particular at least 0.01. Here, the normal relative partial dispersion is defined by $$P_{g,F}^{normal}(\nu_d) = 0.6438 - 0.001682\ \nu_d,$$

which is to say by a straight line in a diagram that shows a dependence between the normal relative partial dispersion $$P_{g,F}^{normal}$$

and the Abbe number $\nu_d$. Relative partial dispersion describes a difference between the refractive indices of two specific wavelengths in relation to a reference wavelength interval and represents a measure for the relative strength of the dispersion between these two wavelengths in the spectral range. In the present case, the three wavelengths required to this end are the wavelength of the g line of mercury (435.83 nm), the wavelength of the F line of hydrogen (486.13 nm) and the C line of hydrogen (656.21 nm), and so the relative partial dispersion $P_{g,F}$ is given by $$P_{g,F} = \frac{n_g - n_F}{n_F - n_C},$$

where $\eta_F$ and $\eta_C$ are the same as in the case of $\nu_d$. A different definition can also be used for the relative partial dispersion, in which the F and C lines of hydrogen are replaced by the F and C' lines of cadmium, for example.

In a further variant, two optical elements of an optical component arranged directly in succession have a common contact face in the form of a free-form surface. This is advantageous in that the specific shape of the free-form surface is available as a parameter for generating the desired wavefront deformation $W_{\alpha,\lambda}(x,y)$, in addition to the refractive index profiles and the lengths or thicknesses of the optical elements in the z-direction; for example, this wavefront deformation can be used for focusing purposes.

The length of the first optical element $\Delta z_1(x,y)$ can be defined as a power series with polynomial coefficients $c_{m,n}$ according to $$\Delta z_1(x, y) = \sum\nolimits_{m,n=0}^{5} c_{m,n} \cdot x^m \cdot y^n$$

or according to $$\Delta z_1(x, y) = \sum\nolimits_{m,n=0}^{3} c_{m,n} \cdot x^m \cdot y^n.$$

However, the summation limits of these equations may also be slated to be higher.

Alternatively, the length of the first optical element $\Delta z_1$ may also be specified in polar coordinates. In this case, the length $\Delta z_1$ is a function of the radius r and polar angle $\varphi$. This is particularly useful if the optical components are twisted relative to one another, as described in the laid-open application DE 10 2015 119 255 A1. Then, the wavefront deformation contains an angle of rotation $\alpha$ rather than the displacement path $\alpha$, and the spatial coordinates (x, y) should be replaced by polar coordinates, with the result that the wavefront deformation is given by $W_{\alpha,\lambda}(r, \varphi)$ rather than by $W_{\alpha,\lambda}(x, y)$. Naturally, it is also conceivable that the two optical components are both displaced relative to one another and twisted relative to one another.

At least one optical element of at least one optical component may comprise or consist of one or more of the following materials: Glass P-SF68 by SCHOTT AG, glass N-LASF44 by SCHOTT AG, glasses N-FK58 and N-BK7 by SCHOTT AG, polymethylmethacrylate (PMMA) and polycarbonate (PC). However, all other glasses can be used just as well, for example those from Ohara, Corning, Guoguang, etc. An exemplary embodiment contains optical elements made of the media N-LASF44 and P-SF68. It goes without saying that other material combinations are also conceivable.

In a further advantageous variant, a first optical element of the first optical component respectively comprises or consists of PMMA and a second optical element of the first optical component respectively comprises or consists of PC. In this variant, too, there may be a second optical component configured structurally identically to the described first optical component, with the respective second optical elements, which is to say the optical elements comprising PC, being arranged facing one another.

An optical device is provided in further example embodiments. The optical device can be, for example, an optical observation device such as a microscope, in particular a surgical microscope, a telescope, a camera, or an optical instrument from the field of ophthalmology, etc. However, it can also be another optical device, such as for example an optical measurement device. Said device is equipped with at least one wavefront manipulator. The effects and advantages described with reference to the wavefront manipulator can therefore be attained in the optical device.

Also disclosed is a method of using at least one wavefront manipulator. At least one wavefront manipulator as provided herein serves to cause an adjustable change in a wavefront, for example any desired but fixed linear combination of Zernike terms, and/or to bring about one or more of the corrections or reductions specified below: coma, astigmatism, dichromatic correction, trichromatic correction, reduction of the secondary spectrum, reduction of the tertiary spectrum.

In a further use of a wavefront manipulator, it can be used to bring about a position-dependent correction of at least one wavefront error in a zoom objective. To this end, the wavefront manipulator can be arranged, in particular, in the region of an (approximately) collimated beam path in the zoom objective and can be laterally deflected, in each case in a manner dependent on the position of the zoom objective, such that said wavefront manipulator compensates for a wavefront error (e.g., a longitudinal chromatic aberration, a spherical aberration, etc.) of the zoom objective. Furthermore, it is possible to arrange this wavefront manipulator in a region such that light beams from different field points illuminate approximately the same region of the wavefront manipulator.

The basic principles for constructing the free-form surfaces according to the prior art are presented below. In the case of an explicit surface representation in the form z(x,y), the free-form surface may preferably be described by a polynomial which only has even powers of x in a direction x orthogonal to the movement direction of the optical components and only has odd powers of y in a direction y parallel to the movement direction. Initially, the free-form surface z(x,y) may be described in general for example by a polynomial expansion of the form $$z(x, y) = \sum_{m,n=1}^{\infty} C_{m,n} x^m y^n$$

where $c_{m,n}$ represents the expansion coefficient of the polynomial expansion of the free-form surface of order m in respect of the x-direction and of order n in respect of the y-direction. Here, x, y, and z denote the three Cartesian coordinates of a point lying on the surface in the local surface-related coordinate system. Here, the coordinates x and y should be inserted into the equation as dimensionless indices in so-called lens units. Here, lens units means that all lengths are initially specified as dimensionless numbers and subsequently interpreted in such a way that they are multiplied throughout by the same unit of measurement (nm, μm, mm, m). The background for this is that geometric optics are scale-invariant and, in contrast to wave optics, do not possess a natural unit of length. According to the teaching by Alvarez, a pure defocusing effect may be obtained if the free-form surface of the optical components can be described by the following 3rd order polynomial:

$$z(x, y) = K \cdot \left(x^2 \cdot y + \frac{y^3}{3}\right)$$

Here, the assumption is made that the lateral displacement of the optical components occurs along the y-axis, which is defined thereby. Should the displacement occur along the x-axis, the role of x and y should accordingly be interchanged in the equation above. As it were, the parameter K scales the profile depth and thus sets the obtainable change in refractive power per unit of the lateral displacement path s.

For beams incident parallel to the optical axis OA and for air (refractive index n=1) between the two optical components, the lateral displacement of the optical components by a path a=|±y| thus brings about a change in the wavefront according to the following equation:

$$\Delta W(a, \lambda) = K \cdot \left(2 \cdot a \cdot (x^2 + y^2) + 2 \cdot \frac{a^3}{3}\right.$$

i.e., a change in the focal position by changing the parabolic wavefront component plus a so-called piston term (Zemike polynomial with j=1, n=0 and m=0), where the latter corresponds to a constant phase and precisely does not have an effect on the imaging properties if the optical element is situated in the infinite beam path. Otherwise, the piston term may usually also be ignored for the imaging properties. The surface refractive power of such a zoom lens is given by the following equation: $\Phi_v=4\cdot K\cdot s\cdot(n-1)$. Here, s is the lateral displacement path of an element along the y-direction, K is the scaling factor of the profile depth and n is the refractive index of the material from which the lens is formed, at the respective wavelength.

The invention is explained in greater detail below on the basis of exemplary embodiments with reference to the accompanying figures. Although the invention is more specifically illustrated and described in detail by means of the preferred exemplary embodiments, the invention is not restricted by the examples disclosed and other variations can be derived therefrom by a person skilled in the art, without departing from the scope of protection of the invention.

The figures are not necessarily accurate in every detail and to scale, and can be presented in enlarged or reduced form for the purpose of better clarity. For this reason, functional details disclosed here should not be understood as restrictive, but merely to be an illustrative basis that gives guidance to a person skilled in this technical field for using the present invention in various ways.

The expression "and/or" used here, when it is used in a series of two or more elements, means that any of the elements listed can be used alone, or any combination of two or more of the elements listed can be used. If for example a composition containing the components A, B and/or C is described, the composition may contain A alone; B alone; C alone; A and B in combination; A and C in combination; B and C in combination; or A, B, and C in combination.

Figure 1:
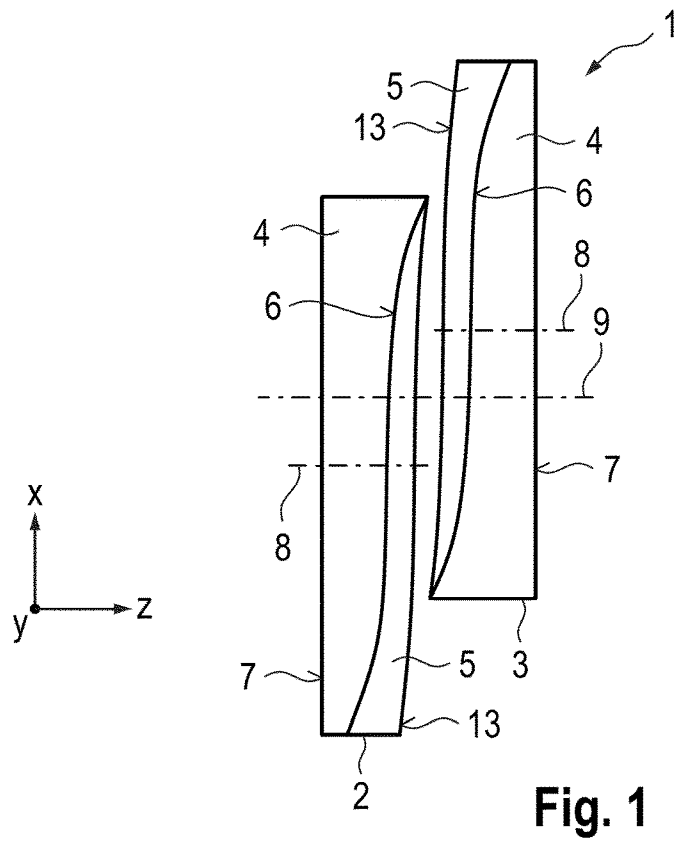
FIG. 1 schematically shows a wavefront manipulator according to certain embodiments of the invention in a longitudinally cut view.

While the invention is amenable to various modifications and alternative forms, specifics thereof have been shown byway of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

FIG. 1 schematically shows a wavefront manipulator. The wavefront manipulator 1 comprises a first optical component 2 and a second optical component 3. The first optical component 2 and the second optical component 3 are arranged in succession along a reference axis, which corresponds to the optical axis 9 both in the example shown and in the subsequent examples. In the example shown, the optical axis 9 runs parallel to the z-direction of a Cartesian coordinate system. The optical components 2, 3 each have a central axis 8 preferably running parallel to the optical axis 9. The first optical component 2 and the second optical component 3 are arranged so as to be movable relative to one another in a plane perpendicular to the optical axis 9, which is to say in an x-y-plane. The first optical component 2 and the second optical component 3 may thus be arranged so as to be movable relative to one another in an x-y-plane by translation and/or rotation.

The first component 2 and the second component 3 each comprise a first optical element 4 and at least one further optical element 5. The first optical element 4 and the at least one further optical element 5, the second optical element 5 in the example shown, have refractive index profiles $\eta_i(\lambda)$ and $\eta_i(\lambda)$, presently $\eta_2(\lambda)$, that differ from one another. The first optical element 4 and the second optical element 5 form a contact face 6, which is preferably configured as a free-form surface. In the variant shown, the two optical components 2 and 3 have the same structural configuration, with corresponding optical elements 4, 5 being arranged facing one another; in the variant shown, the second optical elements 5 are arranged facing one another in each case. Furthermore, the optical components 2 and 3 preferably comprise a plane outer surface 7, with the plane outer surfaces being arranged facing away from one another and being formed by the first optical element 4 in each case. A gap is located between the first and the second optical component and has at least such a width that the two components can be moved relative to one another without coming into mechanical contact. It is useful to choose this gap to be as small as possible.

Figure 2:
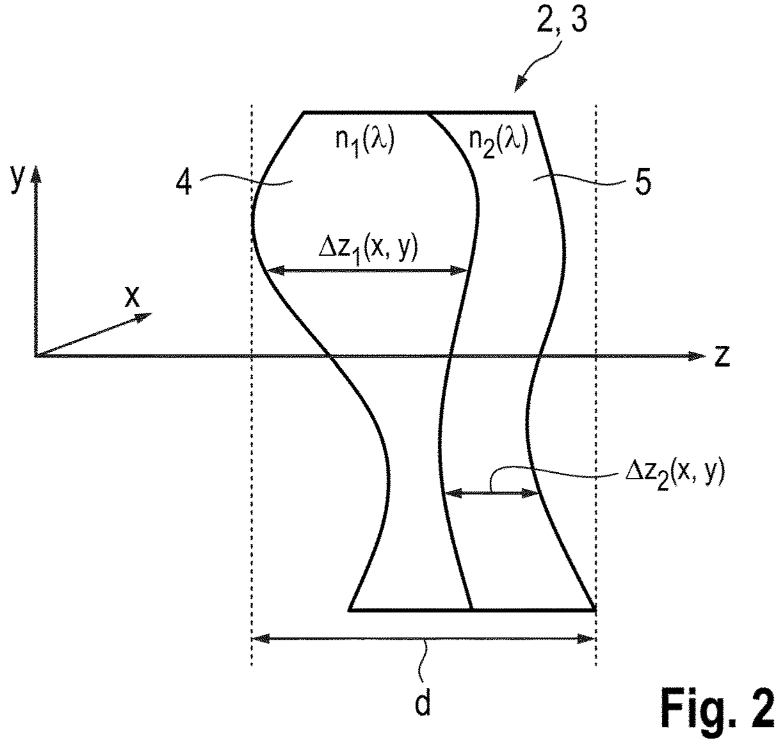
FIG. 2 schematically shows the longitudinal profile of the optical elements of an optical component of a wavefront manipulator according to certain embodiments of the invention, in the z-direction.

In relation to local coordinates x and y of the optical components 2 and 3, respectively, the optical elements 4 and 5 have a spatially dependent length $\Delta z_i$ (x,y) in the z-direction parallel to the optical axis 9. This is shown schematically in FIG. 2. Preferably, the length $\Delta z_i(x,y)$ of the at least one further optical element 5 is linearly dependent on the length $\Delta z_1(x, y)$ of the first optical element 4 $\Delta z_i(x,y)=\gamma_{1,i}\cdot\Delta z_1(x,y)+c_i$ for i=1, 2, . . . , k, where $\gamma_{1,i}$ and $c_i$ are any desired constants). The numbering is arbitrary here. Thus, in the variant shown, the optical element 5 could also be the first optical element and the optical element 4 could also be the second optical element. Care merely needs to be taken that the first optical element 1 has a length $\Delta z_1(x, y)$ that is dependent on the location (x, y).

Any other surface geometry may also be used instead of a plane outer surface 7 of the optical components 2, 3, which are directed outwardly as shown in FIG. 1. However, a plane outer surface 7 is advantageous because this reduces the distance between the surfaces 13 of the wavefront manipulators 1 with a curvature and fewer aberrations arise as a result. It is possible to select materials of the optical elements 4 and 5 which have a small refractive index difference $\eta_i(\lambda_{II})-\eta_2(\lambda_{II})$ at a wavelength $\lambda_{II}$. Hence, the interface 6 between the two materials has only a small effect and most of the refractive power arises at the outer surface 13 of the respective optical component with a curvature, this outer surface 13 being located on the inner side of the wavefront manipulator 1 as shown in FIG. 1. In this case, the distance between the refractive surfaces of the wavefront manipulator is reduced again, with the result that fewer aberrations arise.

Figure 3:
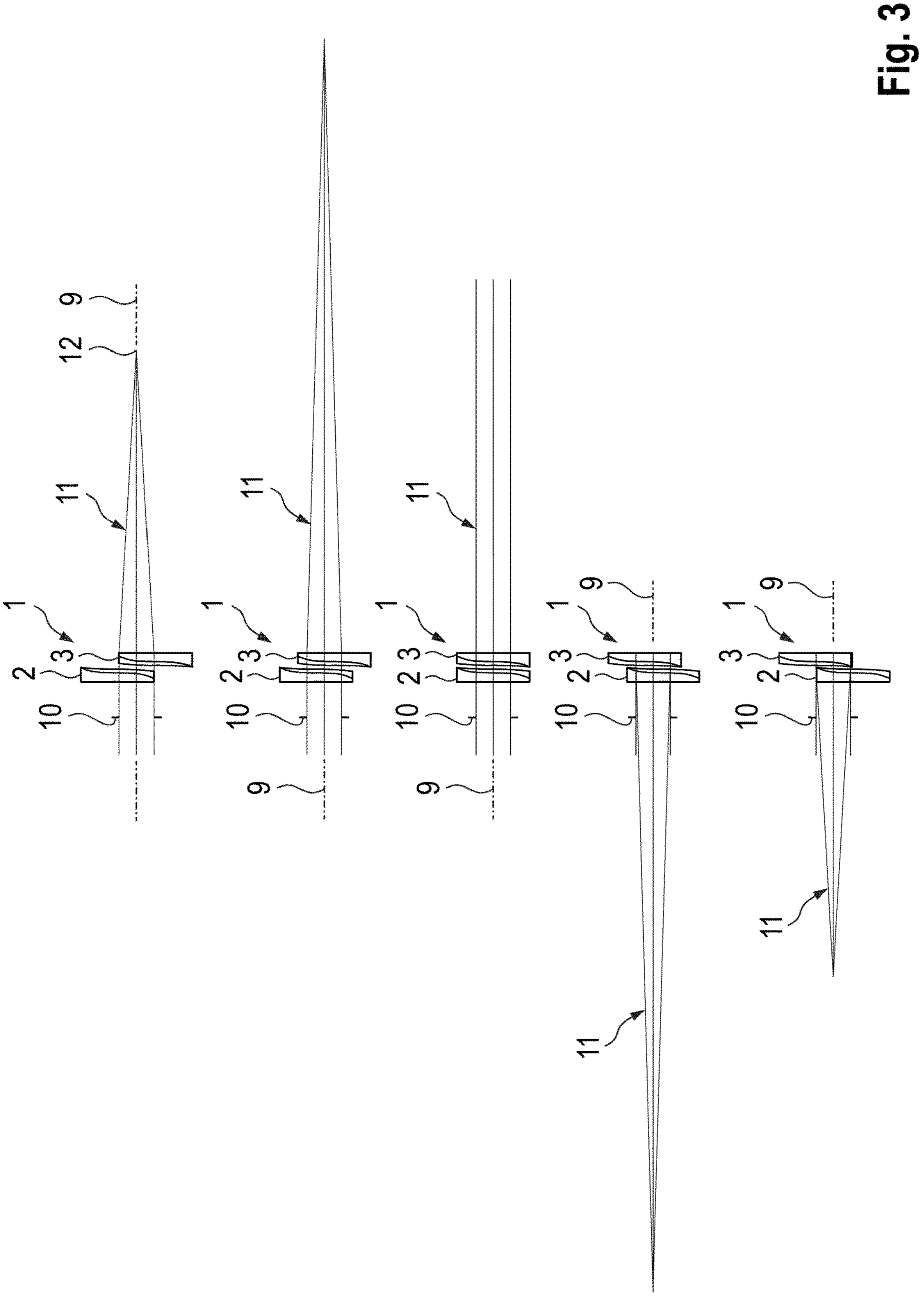
FIG. 3 shows the beam path through a wavefront manipulator according to certain embodiments of the invention for different displacement paths, for the purpose of varying the defocus.

FIG. 3 shows the beam path through a wavefront manipulator 1 for different displacement paths a of the two optical components 2 and 3 relative to one another perpendicular to the optical axis 9, for the purpose of varying the defocus. The first component image from the top corresponds to a displacement path of a=+5 mm, the second component image from the top corresponds to a displacement path of a=+2.5 mm, the third component image from the top corresponds to a displacement path of a=0 mm, the fourth component image from the top corresponds to a displacement path of a=−2.5 mm, and the bottom component image corresponds to a displacement path of a=−5 mm. The aperture is identified by the reference sign 10. The plotted light beams 11 correspond to a plane wave incident on the aperture 10. In the case of negative displacement paths a, the rightward propagating beams 11 are lengthened to the left, with the result that the focus 12 is located to the left of the wavefront manipulator 1.

Three specific exemplary embodiments are described hereinbelow. The exemplary embodiments show how the length $\Delta z_1(x,y)$ and the constants $\gamma_{1,i}$ and $c_1$ can be chosen in a manner dependent on the refractive index profiles of the materials involved such that it is possible to realize wavefront manipulators which generate the desired wavefront deformations $W_{\alpha,\lambda}(x, y)$ in an optical system. In particular, the length $\Delta z_1(x, y)$ can be chosen in accordance with table 1 on page 88 of citation 1 cited at the outset. For example, this makes it possible to generate tilt, focusing, astigmatism, coma, spherical aberration, or linear combinations thereof.

The following describes the basic structure of the achromatic wavefront manipulator, which generates virtually identical wavefront deformations $W_{\alpha,\lambda}(x, y)$ at at least two wavelengths $\lambda_I$ and $\lambda_{III}$, with $\lambda_I<\lambda_{III}$. It consists of two identical optical components 2 and 3, which are each constructed from two optical elements 4 and 5 with refractive index profiles $\eta_1(\lambda)$ and $\eta_2(\lambda)$, as shown schematically in FIG. 2. The two dashed lines parallel to the y-axis illustrate the position of two planes at the distance d, said planes extending parallel to the xy-plane and having one of the two optical components 2 and 3 of the wavefront manipulator 1 located therebetween. Straight lines through the point (x, y, z=0 mm) parallel to the z-axis run a geometric length $\Delta z_1$(x, y) through the first optical element 4 and a geometric length $\Delta z_2$(x, y) through the second optical element 5. Consequently, the expression of the following equation (A-1)

applies to the optical path length $l(x, y, \lambda)$ along a straight line between these planes in the case of a wavelength $\lambda$:

$$l(\lambda, x, y) = \Delta z_1(x, y)\cdot n_1(\lambda) + \Delta z_2(x, y)\cdot n_2(\lambda) + [d - \Delta z_1(x, y) - \Delta z_2(x, y)]. \quad \text{(A-1)}$$

So that the wavefront manipulator generates the same wavefront deformation Wd(x, y) for the two wavelengths $\lambda_I$ and $\lambda_{III}$ in the case of a displacement of the optical components 2 and 3 in the x-y-plane through the distance a, the following equation (A-2) with a constant c' independent of (x, y) must apply:

$$l(\lambda_I, x, y) = l(\lambda_{III}, x, y) + c' \quad \text{(A-2)}$$

Combining equations (A-1) and (A-2) supplies equations (A-3) and (A-4):

$$\Delta z_1(x, y)\cdot n_1(\lambda_I) + \Delta z_2(x, y)\cdot n_2(\lambda_I) = \Delta z_1(x, y)\cdot n_1(\lambda_{III}) + \Delta z_2(x, y)\cdot n_2(\lambda_{III}) + c' \quad \text{(A-3)}$$

$$\Leftrightarrow \Delta z_1(x, y)\cdot[n_1(\lambda_I) - n_1(\lambda_{III})] + \Delta z_2(x, y)\cdot[n_2(\lambda_I) - n_2(\lambda_{III})] = c' \quad \text{(A-4)}$$

Now, any desired wavelength $\lambda_{II}$ with $\Delta_I<\lambda_{II}<\lambda_{III}$ is chosen and, as conventional in the literature, Abbe numbers $\nu_1$, $\nu_2$ are defined for the optical elements 4 and 5 according to $$\nu_i \equiv \frac{n_i(\lambda_{II}) - 1}{n_i(\lambda_I) - n_i(\lambda_{III})},$$

Consequently, equations (A-5) and (A-6) below emerge from equation (A-4):

$$\Delta z_1(x, y)\cdot\frac{n_1(\lambda_{II}) - 1}{\nu_1} + \Delta z_2(x, y)\cdot\frac{n_2(\lambda_{II}) - 1}{\nu_2} = c' \Leftrightarrow \quad \text{(A-5)}$$

$$\Delta z_2(x, y) = -\frac{n_1(\lambda_{II}) - 1}{\nu_1}\cdot\frac{\nu_2}{n_2(\lambda_{II}) - 1}\cdot\Delta z_1(x, y) + \frac{\nu_2}{n_2(\lambda_{II}) - 1}\cdot c'. \quad \text{(A-6)}$$

From the definitions:

$$\gamma_{1,2} \overset{def}{=} -\frac{n_1(\lambda_{II}) - 1}{\nu_1}\cdot\frac{\nu_2}{n_2(\lambda_{II}) - 1} \text{ and } c_2 \overset{def}{=} \frac{\nu_2}{n_2(\lambda_{II}) - 1}\cdot c' \quad \text{(A-7)}$$

the following is obtained:

$$\Delta z_2(x, y) = \gamma_{1,2}\cdot\Delta z_1(x, y) + c_2 \quad \text{(A-8)}$$

and hence the characteristic of the wavefront manipulator according to equation $\Delta z_2(x,y)=\gamma_{1,2}\cdot\Delta z_1(x,y)+c_2$.

A wavefront manipulator for focusing is now designed for the visual spectrum on the basis thereof. The wavelengths are chosen as $\lambda_I=\lambda_F=486.1$ nm, $\lambda_{II}=\lambda_d=587.6$ nm, and $\lambda_{III}=\lambda_C=656.3$ nm. Schott glasses N-LASF44 and P-SF68 are selected as materials 1 and 2, respectively, of the optical elements 4 and 5; these glasses are characterized by the refractive indices $\eta_1(\lambda_d)=1.80420$ and $\eta_2(\lambda_d)=2.00520$, respectively, and by the Abbe numbers $\nu_1=46.50$ and $\nu_2=21.00$, respectively. Hence, according to (A-7), the value $\gamma_{1,2}=-0.3613$ arises for the proportionality factor $\gamma_{1,2}$.

The length $\Delta z_1(x, y)$ is defined as a power series $$\Delta z_1(x, y) = \sum\nolimits_{m,n=0}^{5} c_{m,n}\cdot x^m\cdot y^n \quad \text{(A-9)}$$

with the following polynomial coefficients: $c_{0,0}=2$ mm, $c_{0,1}=-2.550946\text{E}-02$, $c_{2,1}=3.401261\text{E}-04$ mm$^{-2}$, $c_{0,3}=1.133754\text{E}-04$ mm$^{-2}$, $c_{4,1}=-7.055198\text{E}-09$ mm$^{-4}$, $c_{2,3}=-4.864788\text{E}-09$ mm$^{-4}$, $c_{0,5}=-1.184314\text{E}-09$ mm$^{-4}$.

The coefficient $c_{0,0}$ precisely corresponds to the length $\Delta z_1(0.0)$ along the z-axis. The coefficients $c_{2,1}$ and $c_{0,3}$ generate the defocus terms in the wavefront $W_{\alpha,\lambda}(x, y)$. The term $c_{0,1}$, serves to reduce the value range of the length $\Delta z_1(x,y)$ and allows the reduction of the thickness of the medium 2 and of the air gap between the components. Hence, deviations of the realized wavefront deformation from the desired wavefront deformation can be reduced. The higher-order polynomial coefficients $c_{4,1}$, $c_{2,3}$ and $c_{0,5}$ serve to provide the generated wavefront $W_{\alpha,\lambda}(x, y)$ with a form that is as spherical as possible for all displacement paths a, with the result that the transverse aberrations of the overall system remain small.

With the choice of constant $c_2=1.5226$ mm and the already determined constant $\gamma_{1,2}=-0.3613$, and with the constraint $\Delta z_2(x,y)=\gamma_{1,2}\cdot\Delta z_1(x, y)+c_2$, the length $\Delta z_2(x, y)$ for a wavefront manipulator arises as follows:

$$\Delta z_2(x, y) = -0.3613\cdot\Delta z_1(x, y) + 1.5226 \text{ mm}.$$

The outer interfaces of the wavefront manipulator between air and the first optical element are plane surfaces in each case. In the position with displacement path $\alpha=0$ mm, the air thickness between the two optical components of the wavefront manipulator, which are preferably designed as plates, is 0.2 mm. The displacement path a is in the range $-5.035$ mm$<\alpha<+4.921$ mm. The air gap between the wavefront manipulator and the aperture is 1 mm. Hence, the geometric structure of the wavefront manipulator is described in full.

FIGS. 4, 7, 10, 13, and 16 schematically show an optical device with a wavefront manipulator 1, which is used for adaptation to different front focal lengths. Located downstream of the wavefront manipulator 1 in the direction of incoming radiation there is a rotationally symmetric objective 21 which consists of an aperture (not shown) and two cemented elements 22 and 23. The structure of this objective emerges from appended table 1.

Table 1 illustrates the structure of the rotationally symmetric objective 21 of the first exemplary embodiment, from the aperture to the image plane. The surfaces numbered 2 and 6 represent rotationally symmetric aspheres, the surface geometry of which is given by the following polynomial:

$$z_{asph}(x, y) = \frac{(x^2+y^2)/R}{1+\sqrt{1-(1+k)\cdot\frac{(x^2+y^2)}{R^2}}} + A\cdot(x^2+y^2)^2 + B\cdot(x^2+y^2)^3 + C\cdot(x^2+y^2)^4$$

In the first exemplary embodiment shown in FIGS. 4, 7, 10, 13, and 16, one of the optical elements 4 or 5 comprises or consists of N-LASF44, and the other optical element, for example the further or second optical element, comprises or consists of P-SF68. Each of the shown optical components 2 and 3 may have a thickness of between 2 mm and 3 mm in the z-direction. The shown cemented elements 22 and 23 may each have a thickness of between 5 and 15 mm, for example a thickness or length of approximately 10 mm in the z-direction.

Figure 4:
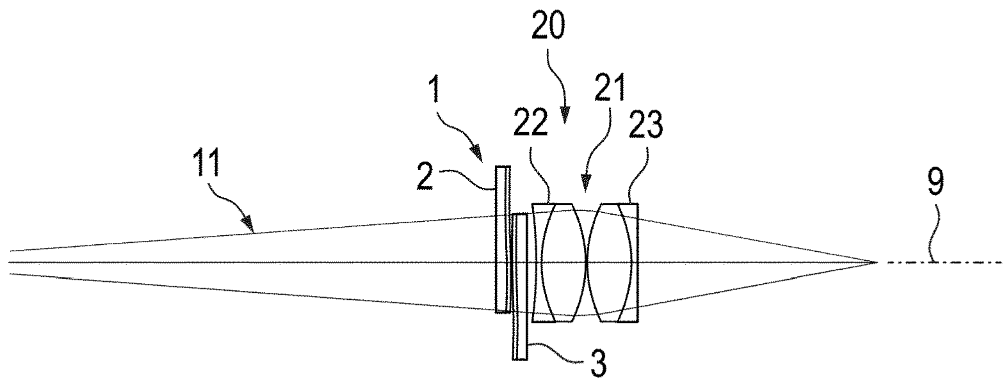
FIGS. 4-18 schematically show a first exemplary embodiment of an optical device according to certain embodiments of the invention with a wavefront manipulator according to certain embodiments of the invention, for different front focal lengths and displacement paths and the associated transverse aberrations.
Figure 5:
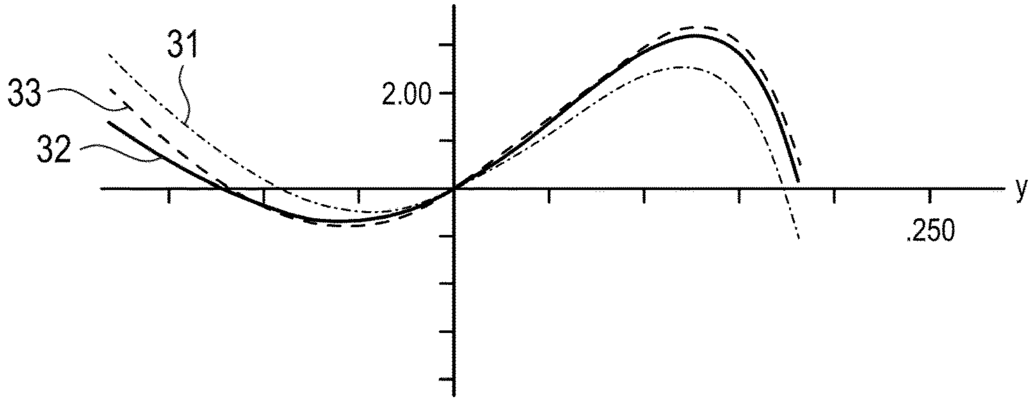
Figure 6:
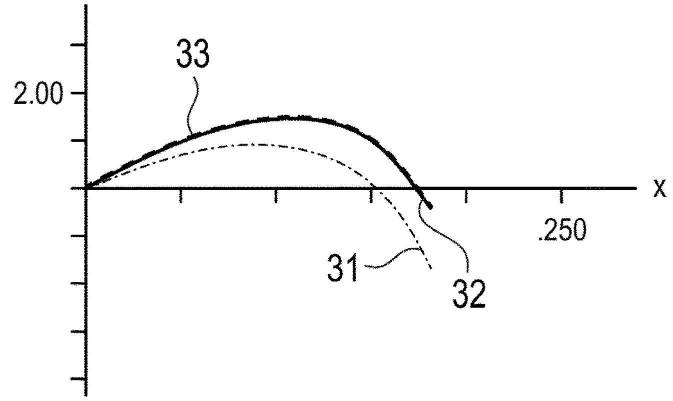
Figure 7:
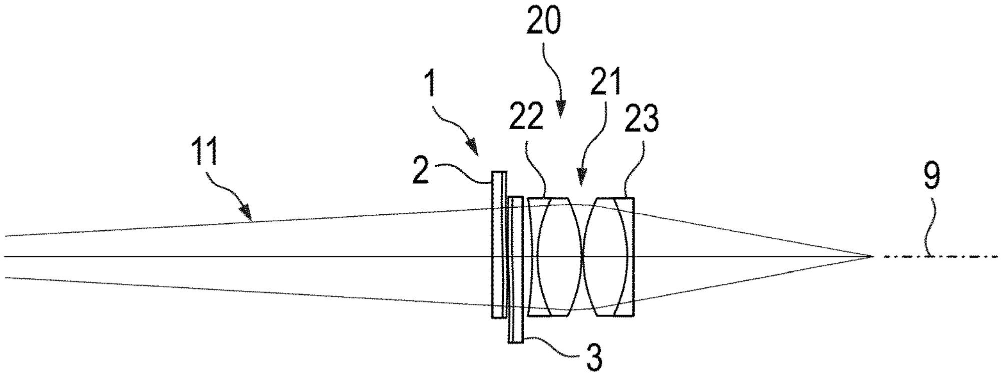
Figure 8:
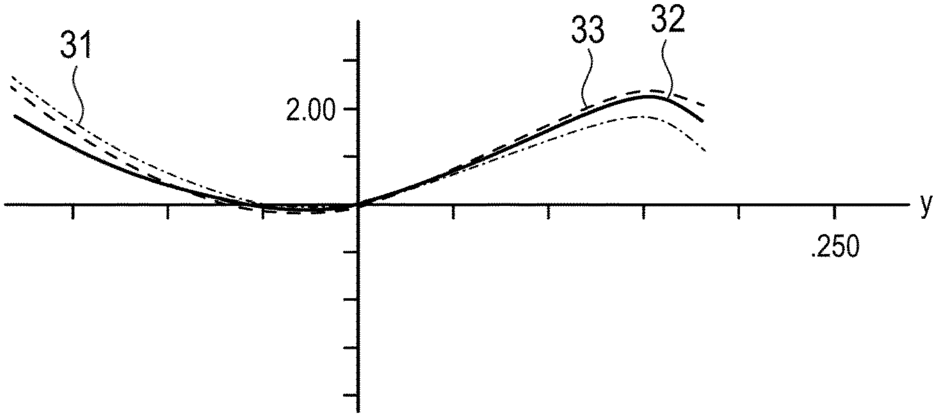
Figure 9:
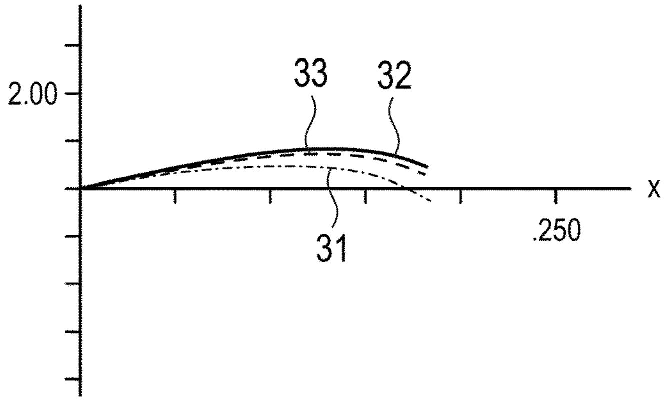
Figure 10:
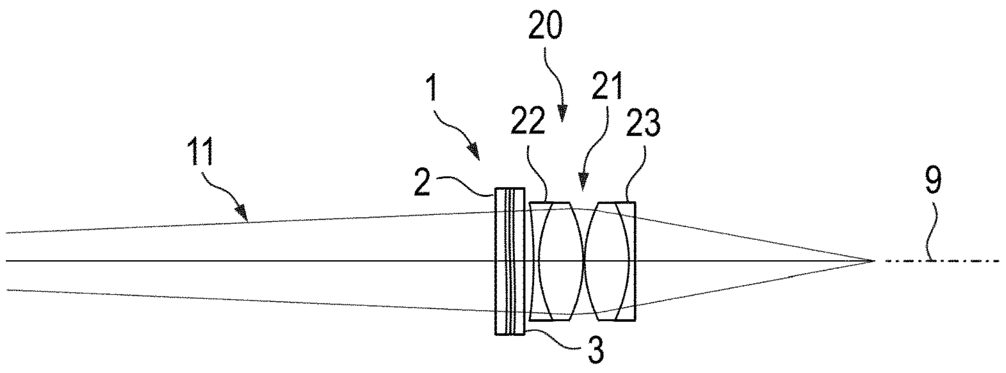
Figure 11:
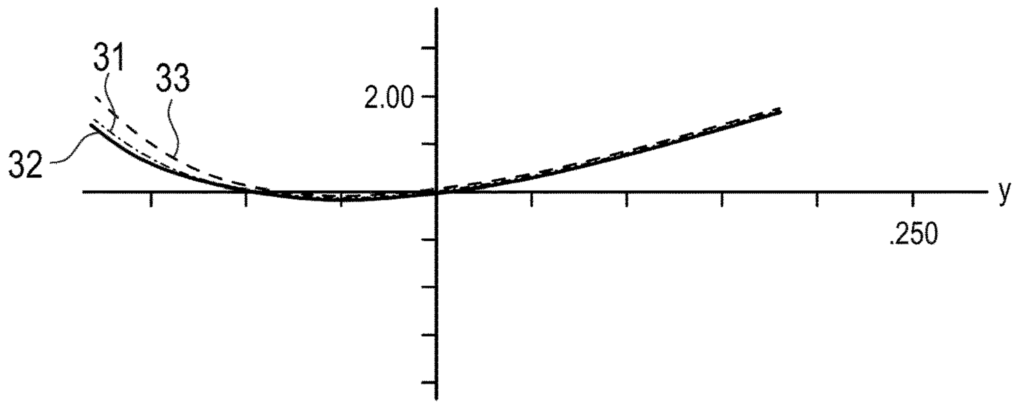
Figure 12:
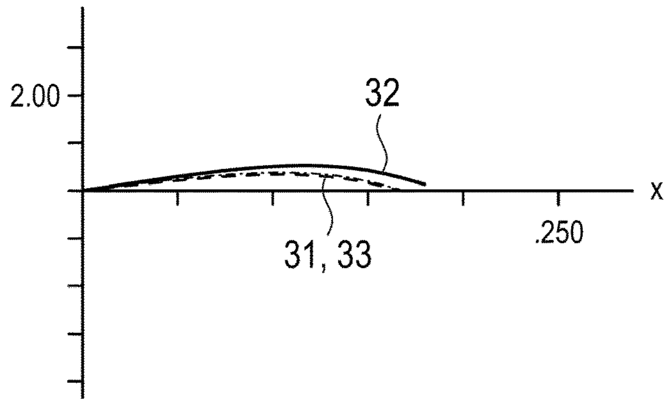
Figure 13:
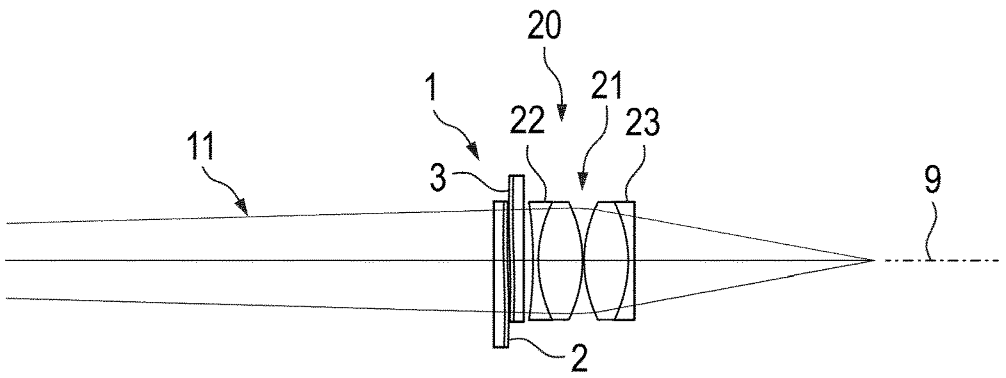
Figure 14:
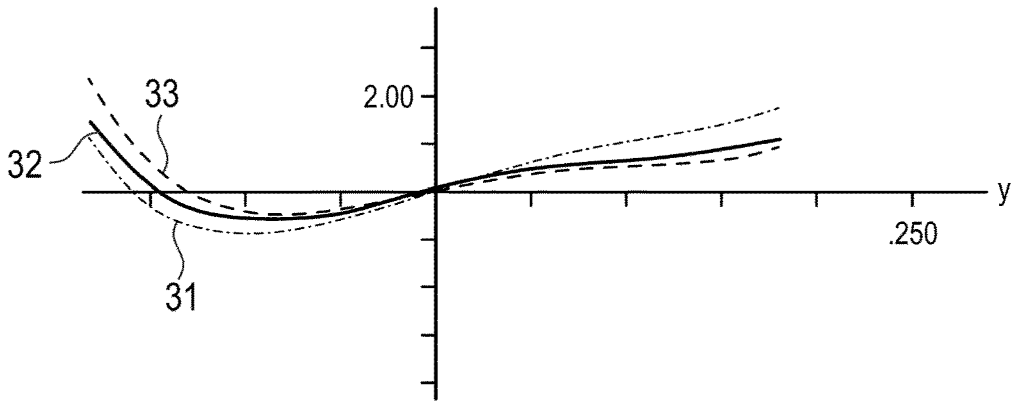
Figure 15:
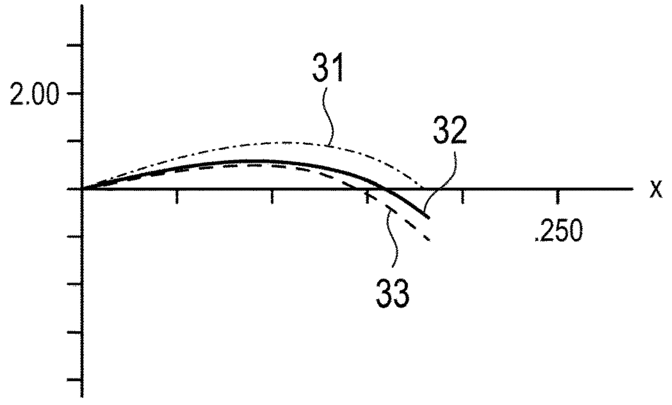
Figure 16:
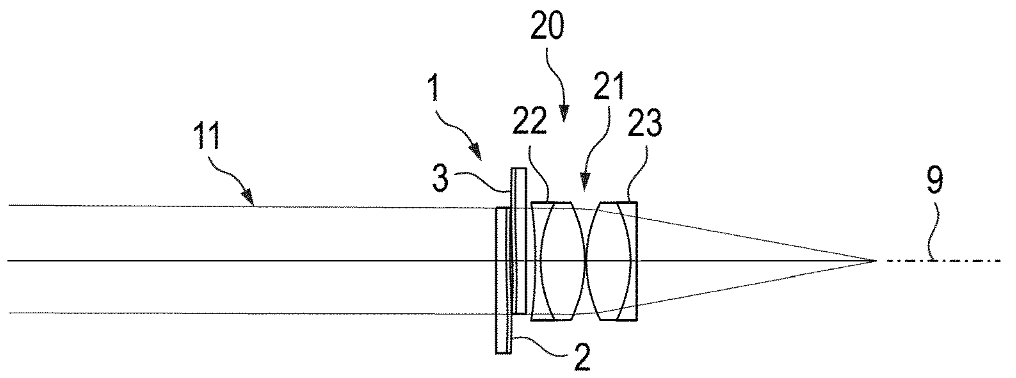
Figure 17:
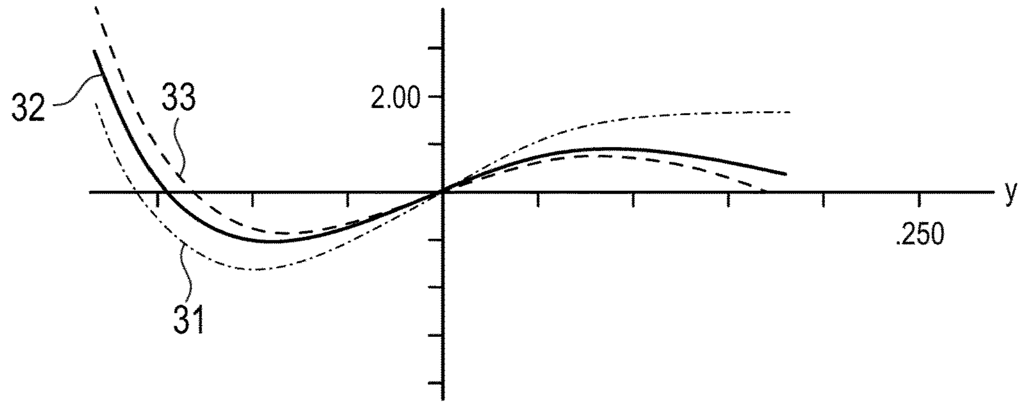
Figure 18:
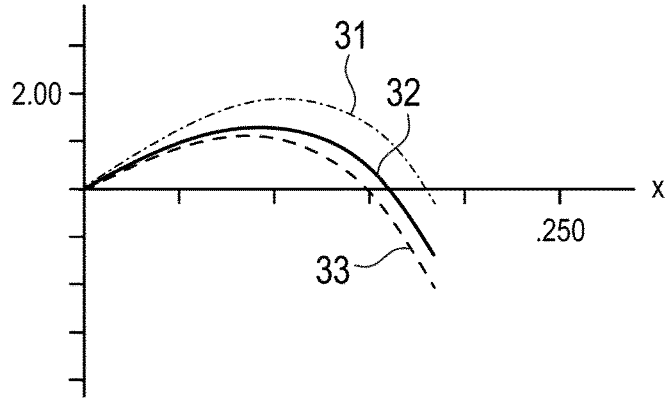

In FIG. 4, the front focal length is 142 mm, and the displacement path is 4.921 mm (a=+4.921 mm). In this case, the front focal length is the distance of the axial object point from the wavefront manipulator 1. FIGS. 5 and 6 show the transverse aberrations in the x- and y-direction, respectively, which belong to the setting in FIG. 4. In this case, the curves belonging to a wavelength of 587.6 nm are identified by reference sign 31, the curves belonging to a wavelength of 656 nm are identified by reference sign 32, and the curves belonging to a wavelength of 486.1 nm are identified by reference sign 33. The scale in the shown diagrams is 2 μm and corresponds to the Airy diameter In FIG. 7, the front focal length is 180 mm, and the displacement path is 2.497 mm (a=+2.497 mm). FIGS. 8 and 9 show the transverse aberrations in the x- and y-direction, respectively, which belong to the setting in FIG. 7. In FIG. 10, the front focal length is 247.9 mm, and the displacement path is 0 mm (a=0 mm). FIGS. 11 and 12 show the transverse aberrations in the x- and y-direction, respectively, which belong to the setting in FIG. 10. In FIG. 13, the front focal length is 400 mm, and the displacement path is −2.537 mm (a=−2.537 mm). FIGS. 14 and 15 show the transverse aberrations in the x- and y-direction, respectively, which belong to the setting in FIG. 13. In FIG. 16, the front focal length is 1000 mm, and the displacement path is −5.035 mm (a=−5.035 mm). FIGS. 17 and 18 show the transverse aberrations in the x- and y-direction, respectively, which belong to the setting in FIG. 16.

The diagrams with the transverse aberrations of the overall system in FIGS. 5, 6, 8, 9, 11, 12, 14, 15, 17, and 18 illustrate the aberrations of the overall system. The Airy diameter is approximately 2 μm. Independently of the wavelength, the transverse aberration curves usually have an absolute value smaller than the Airy diameter, with the result that the longitudinal chromatic aberration has been corrected well and the axially imaged points are imaged practically in diffraction-limited fashion.

Like in the first exemplary embodiment described above, the second exemplary embodiment also uses an achromatic wavefront manipulator for compensating different front focal lengths, with the result that axial points at different distances are focused on the same point. Once again, A1, = $\lambda_F$=486.1 nm, $\lambda_{II}$=$\lambda_d$=587.6 nm, and $\lambda_{III}$=$\lambda_C$=656.3 nm are chosen as wavelengths. Polymethylmethacrylate (PMMA) and polycarbonate (PC) are used as materials 1 and 2, respectively, of the optical elements 4 and 5; these plastics are characterized by the refractive indices $\eta_1(\lambda_d)$=1.491778 and $\eta_2(\lambda_d)$=1.585474, respectively, and by the Abbe numbers $\nu_1$=58.01 and $\nu_2$=29.89, respectively. Hence, according to (A-7), the value $\gamma_{1,2}$=−0.4328 arises for the proportionality factor $\gamma_{1,2}$.

The length $\Delta z_1$(x, y), which a straight line parallel to the z-axis runs through the medium of PMMA is defined as a power series $$\Delta z_1(x, y) = \sum_{m,n=0}^{5} c_{m,n}\cdot x^m\cdot y^n$$

with the following polynomial coefficients: $c_{0,0}$=1 mm, $c_{0,1}$=−5.966441E−02, $c_{2,1}$=2.796769E−03 $mm^{-2}$, $c_{0,3}$=9.322565E−04 $mm^{-2}$, $c_{4,1}$=−2.605597E−07 $mm^{-4}$, $c_{2,3}$=−1.874351E−07 $mm^{-4}$, $c_{0,5}$=−4.108484E−08 $mm^{-4}$.

With the choice of constant $c_2$=+0.8328 mm, and with the constraint (1), the length $\Delta z_2$ (x, y) for a wavefront manipulator arises as follows:

$$\Delta z_2(x, y) = -0.4328\cdot\Delta z_1(x, y) + 0.8328\ \text{mm}.$$

The outer interfaces of the wavefront manipulator between air and the first medium are plane surfaces in each case. In the position with displacement path α=0 mm, the air thickness between the two plates of the wavefront manipulator is 0.2 mm. The displacement path α is in the range −3.013 mm<α<+2.864 mm. The air gap between the wavefront manipulator and the aperture is 1 mm. Hence, the geometric structure of the wavefront manipulator is described in full.

FIGS. 19, 22, 25, 28, and 31 schematically show an optical device with a wavefront manipulator 1, which is used for adaptation to different front focal lengths. Located downstream of the wavefront manipulator 1 in the direction of incoming radiation there is a rotationally symmetric objective 21 which consists of an aperture situated between the wavefront manipulator 1 and objective 21, and two cemented elements 22 and 23. The structure of this objective emerges from appended table 2. The latter describes the structure of the rotationally symmetric objective of the second exemplary embodiment, from the aperture to the image plane. The asphere surface can be calculated using the expression for $z_{asph}$(x, y) given above.

Figure 19:
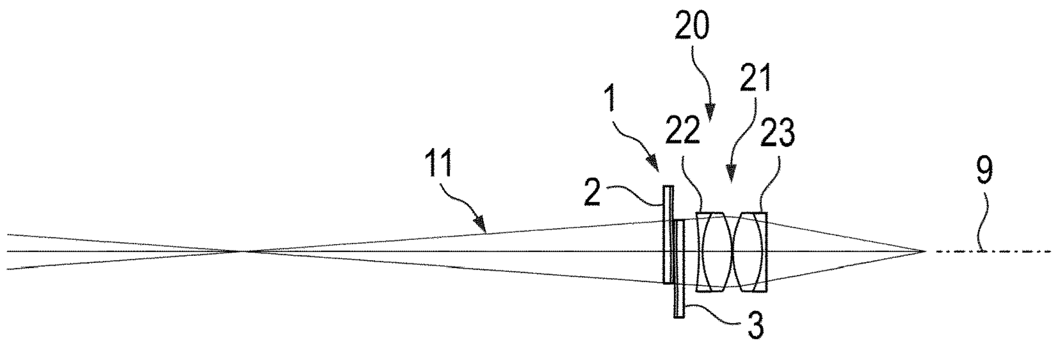
FIGS. 19-33 schematically show a second exemplary embodiment of an optical device according to certain embodiments of the invention with a wavefront manipulator according to certain embodiments of the invention, for different front focal lengths and displacement paths and the associated transverse aberrations.
Figure 20:
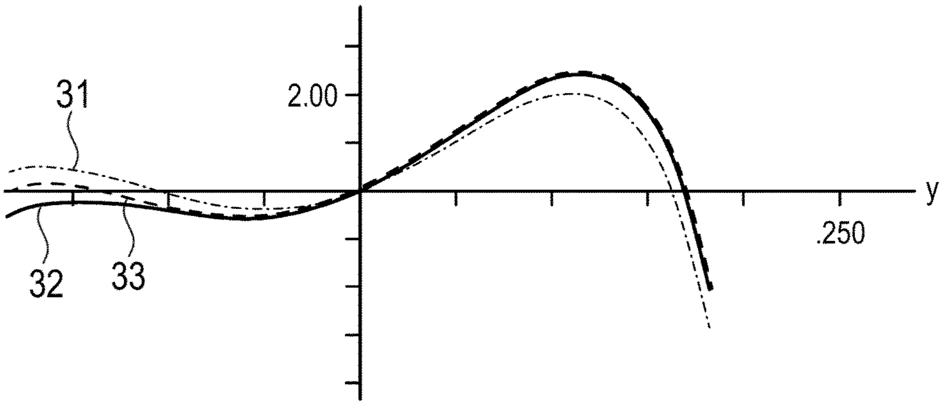
Figure 21:
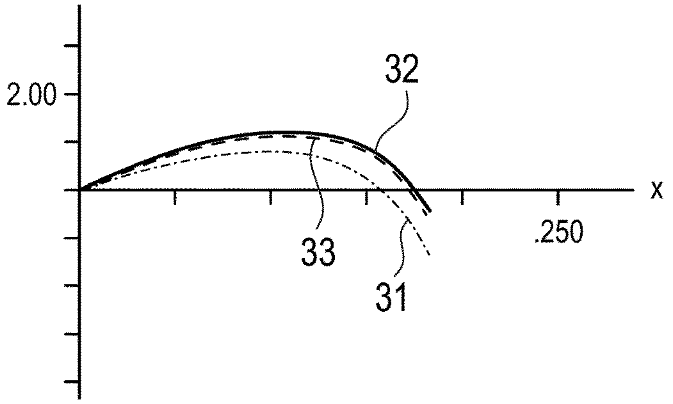
Figure 22:
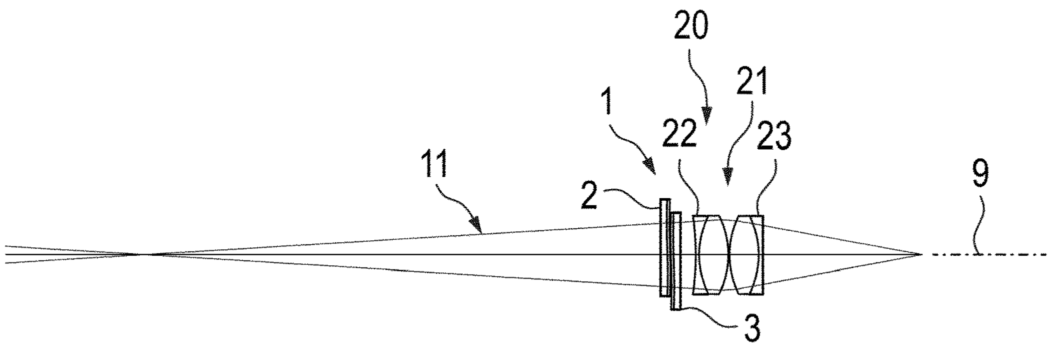
Figure 23:
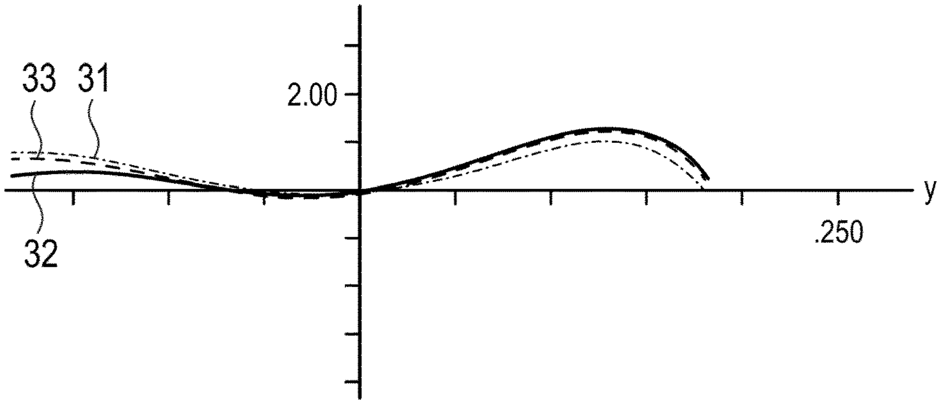
Figure 24:
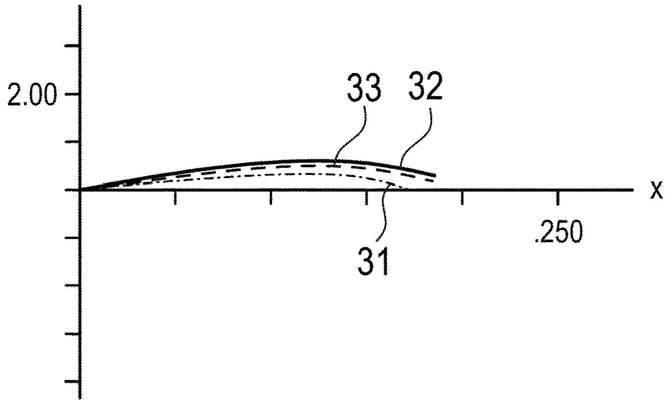
Figure 25:
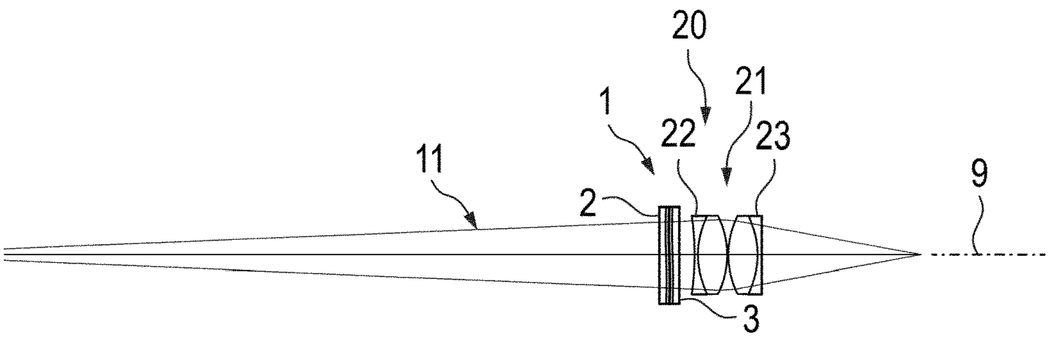
Figure 26:
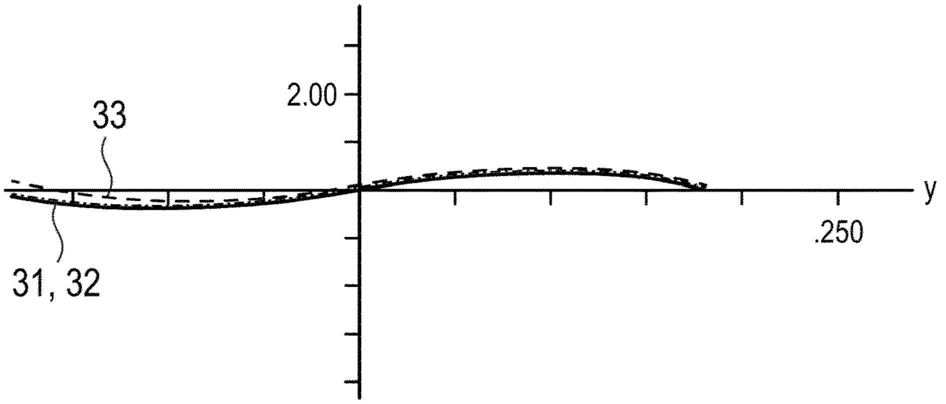
Figure 27:
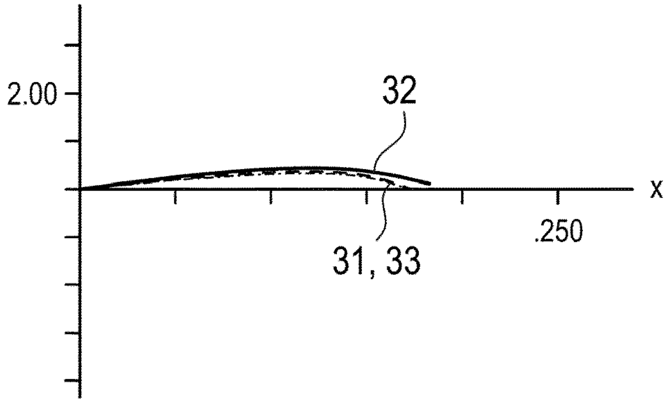
Figure 28:
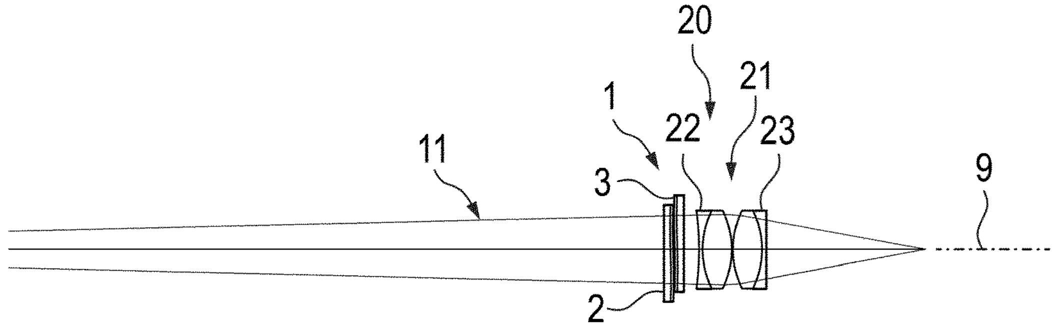
Figure 29:
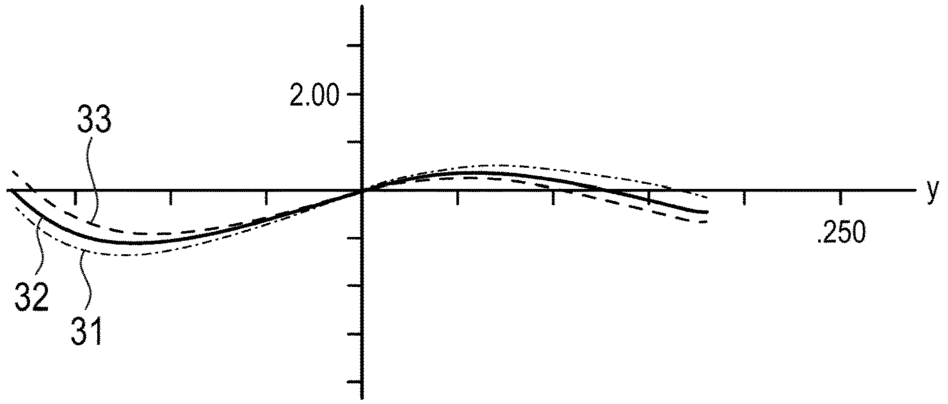
Figure 30:
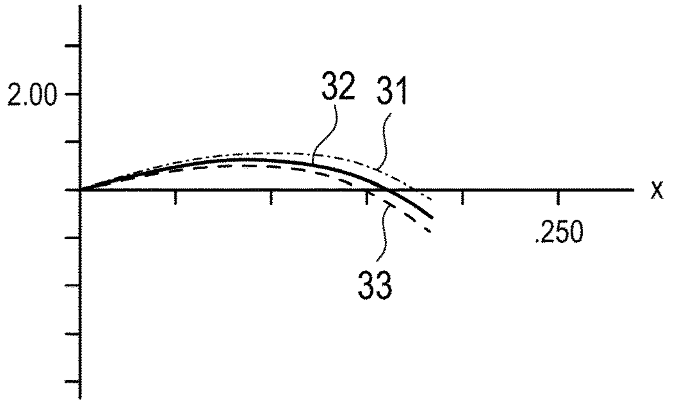
Figure 31:
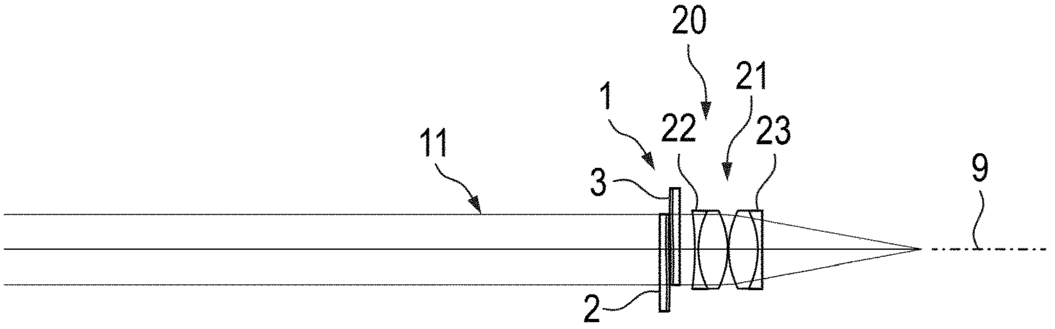
Figure 32:
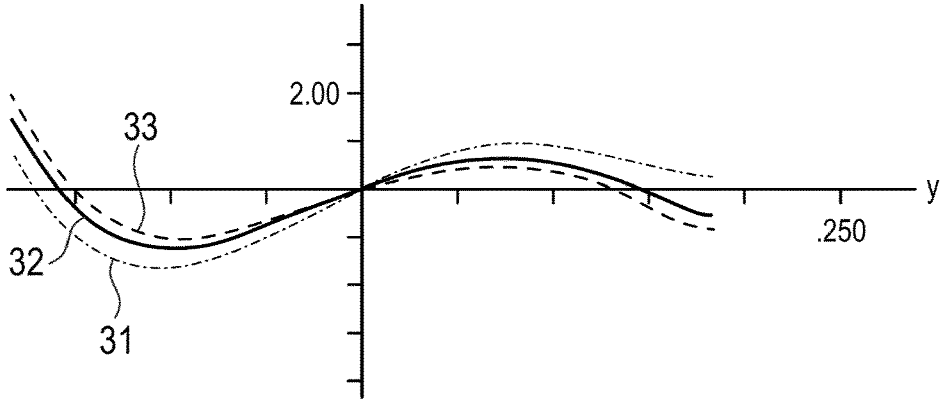
Figure 33:
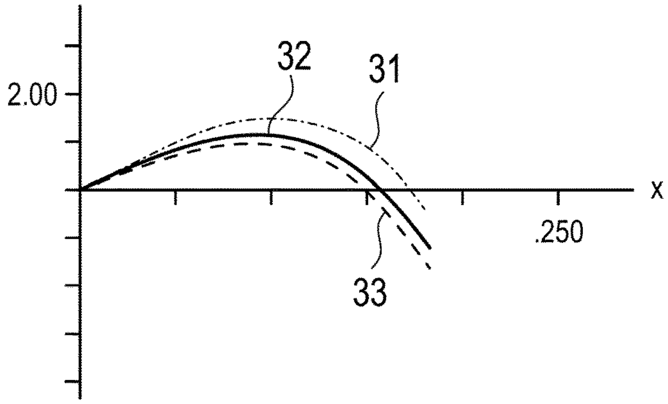
Figure 34:
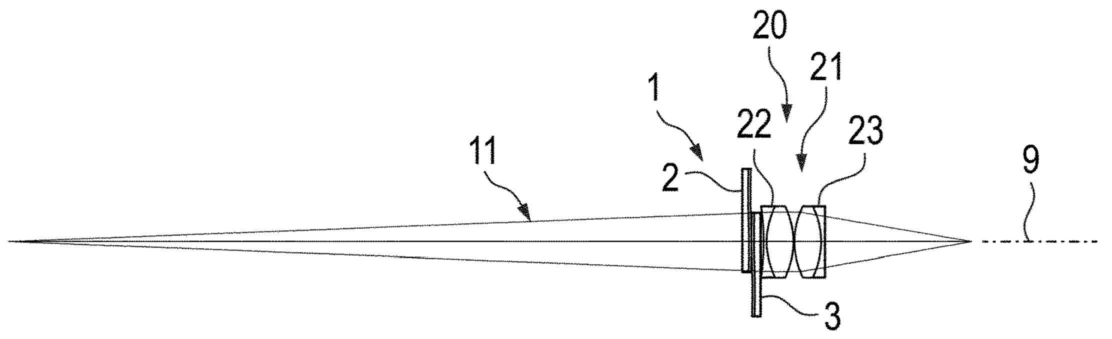
FIGS. 34-48 schematically show a third exemplary embodiment of an optical device according to certain embodiments of the invention with a wavefront manipulator according to certain embodiments of the invention, for different displacement paths and the associated transverse aberrations.
Figure 35:
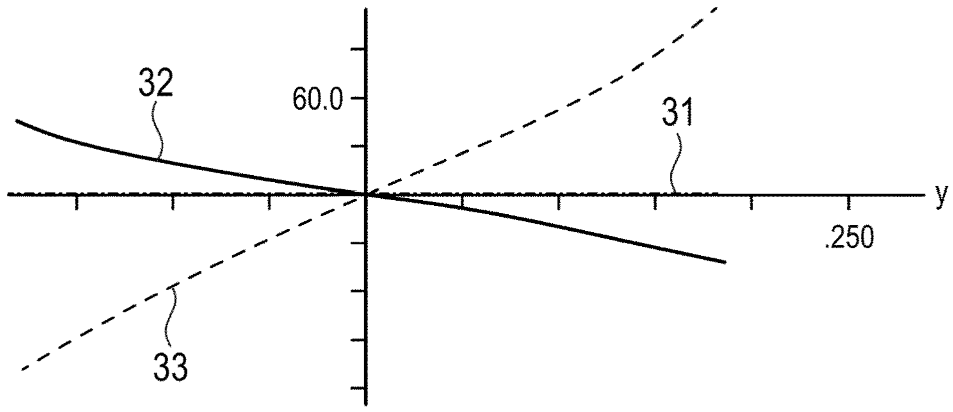
Figure 36:
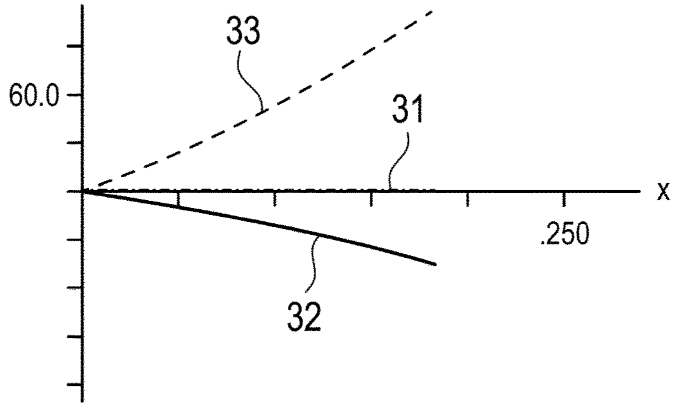
Figure 37:
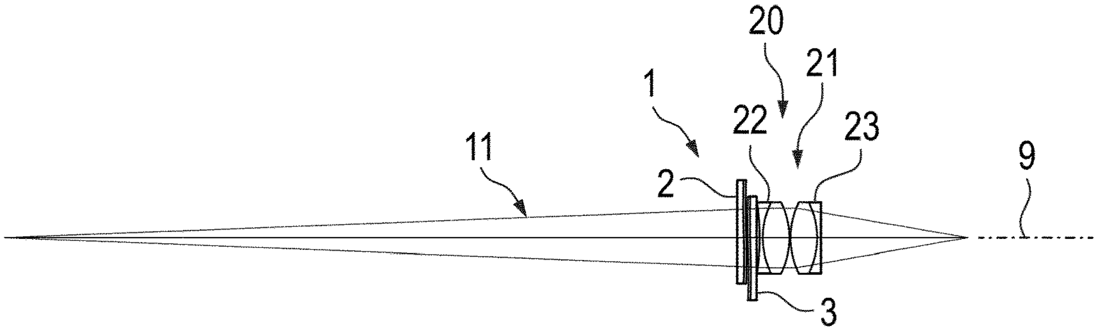
Figure 38:
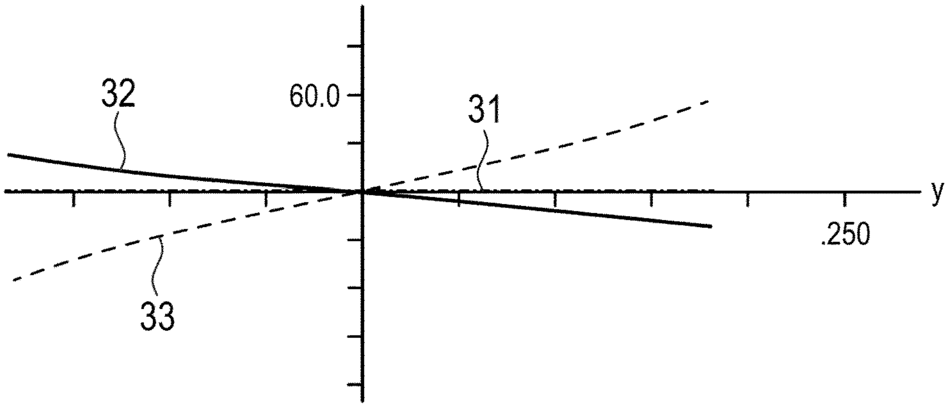
Figure 39:
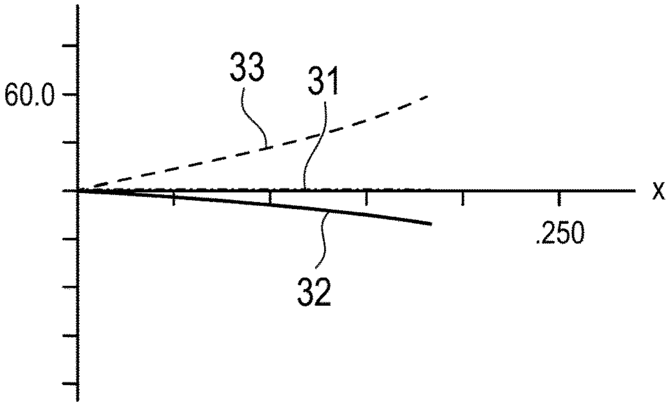
Figure 40:
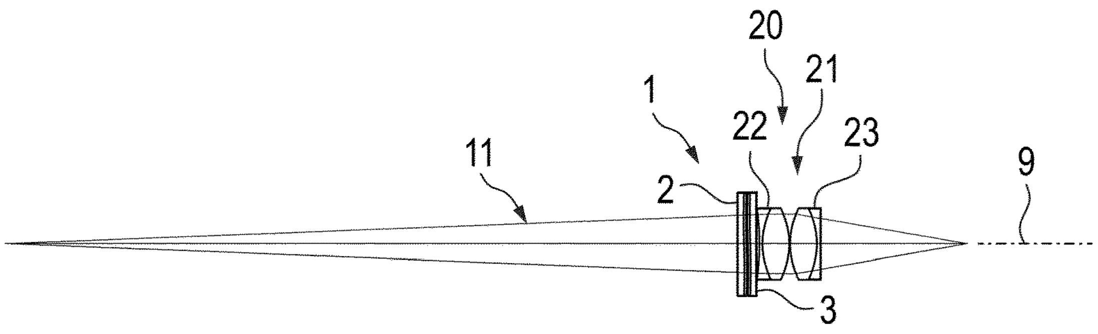
Figure 41:
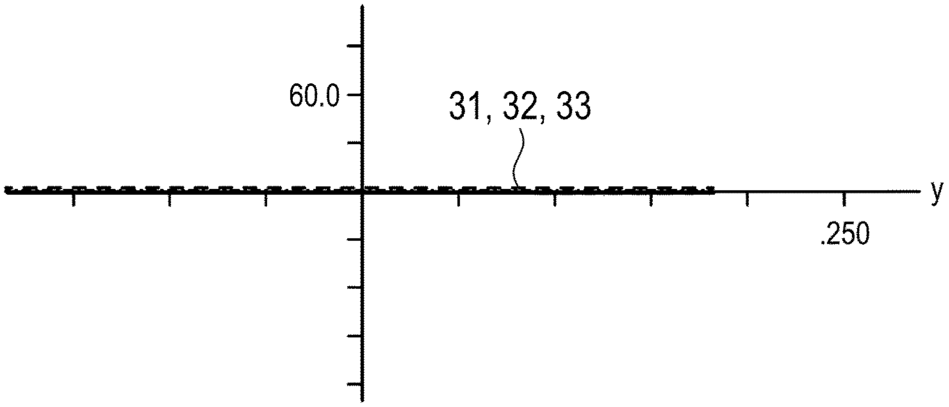
Figure 42:
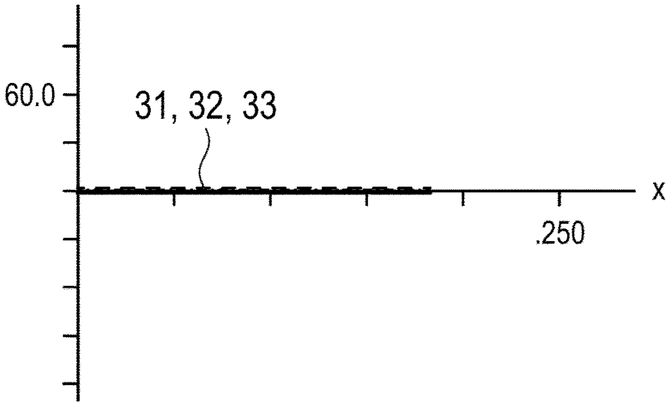
Figure 43:
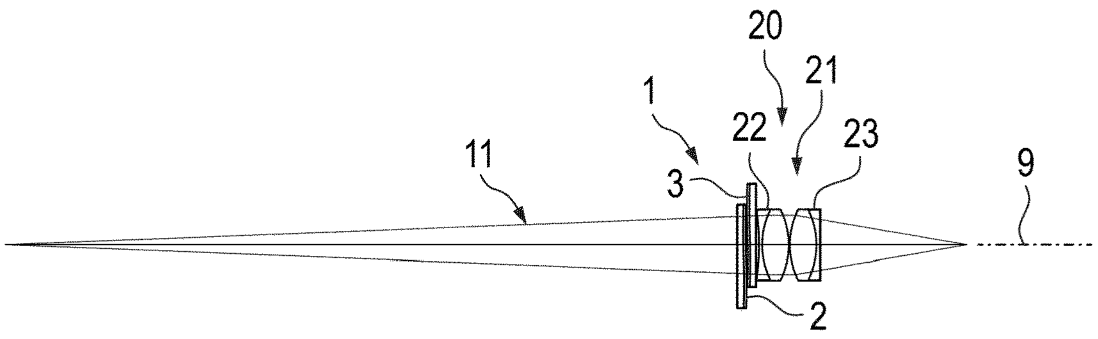
Figure 44:
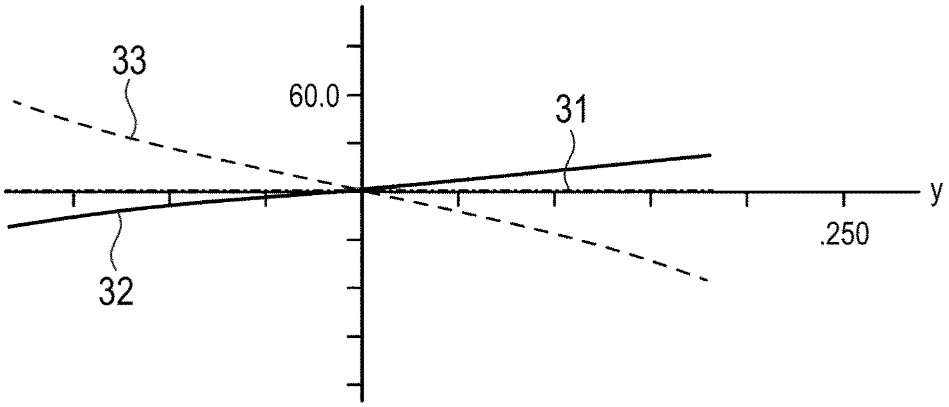
Figure 45:
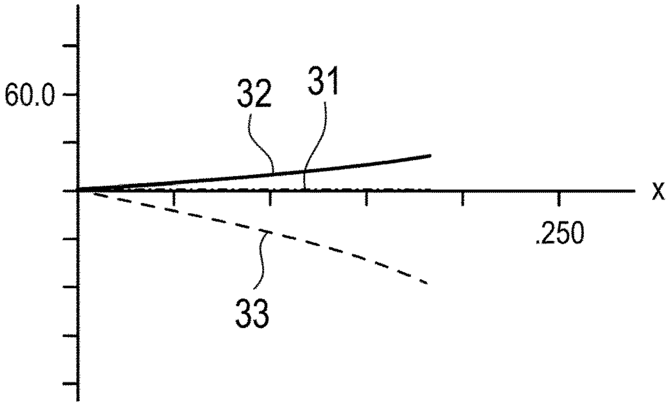
Figure 46:
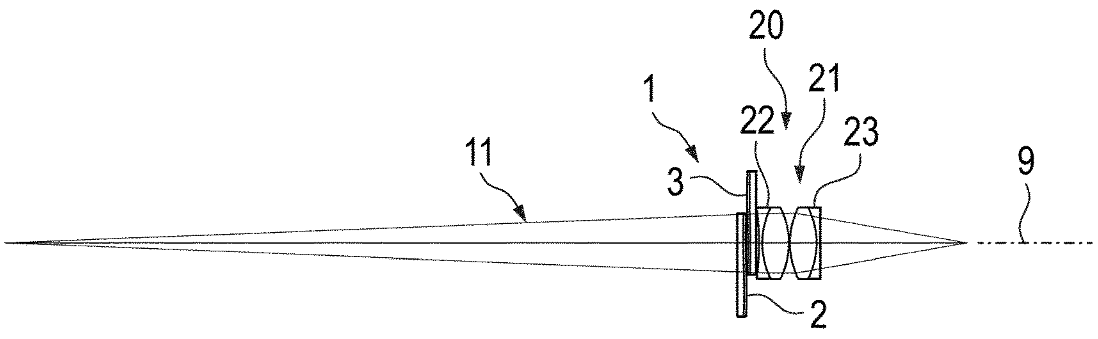
Figure 47:
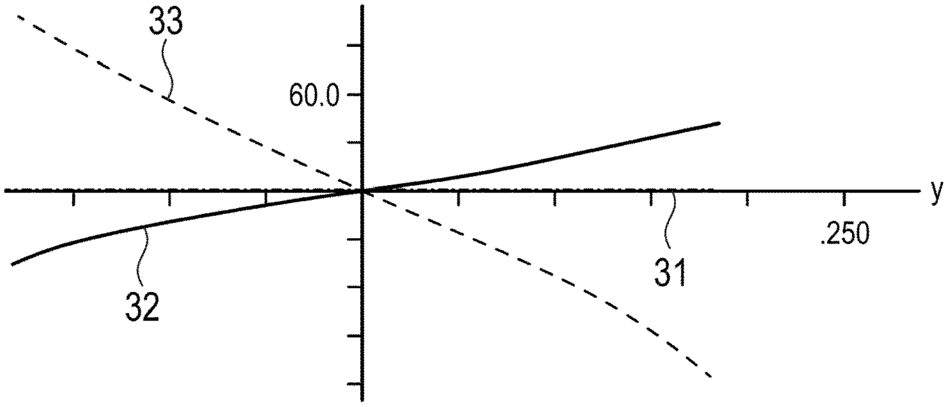
Figure 48:
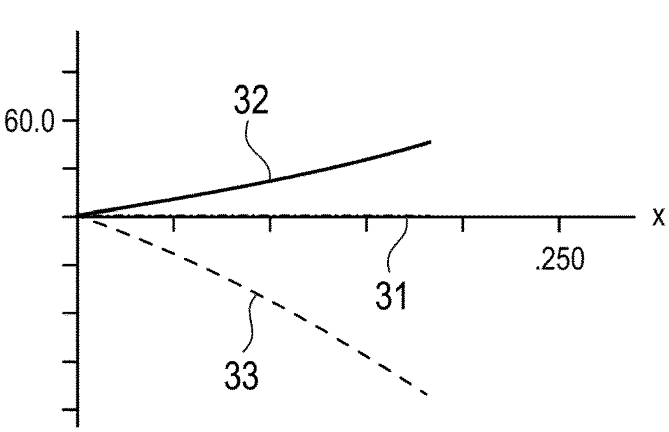

In FIG. 19, the front focal length is 62.5 mm, and the displacement path is 2.864 mm (a=+2.864 mm). FIGS. 20 and 21 show the transverse aberrations in the x- and y-direction, respectively, which belong to the setting in FIG. 19. In FIG. 22, the front focal length is 83 mm, and the displacement path is 1.427 mm (a=+1.427 mm). FIGS. 23 and 24 show the transverse aberrations in the x- and y-direction, respectively, which belong to the setting in FIG. 22. In FIG. 25, the front focal length is 122.5 mm, and the displacement path is 0 mm (a=0 mm). FIGS. 26 and 27 show the transverse aberrations in the x- and y-direction, respectively, which belong to the setting in FIG. 25. In FIG. 28, the front focal length is 250 mm, and the displacement path is −1.547 mm (a=−1.547 mm). FIGS. 29 and 30 show the transverse aberrations in the x- and y-direction, respectively, which belong to the setting in FIG. 28. In FIG. 31, the front focal length is at infinity, and the displacement path is −3.013 mm (a=−3.013 mm). FIGS. 32 and 33 show the transverse aberrations in the x- and y-direction, respectively, which belong to the setting in FIG. 31.

The diagrams with the transverse aberrations of the overall system of FIGS. 20, 21, 23, 24, 26, 27, 29, 30, 32, and 33 illustrate the aberrations of the overall system. The Airy diameter is approximately 2 μm. Independently of the wavelength, the transverse aberration curves usually have an absolute value smaller than the Airy diameter, with the result that the longitudinal chromatic aberration has been corrected well and the axially imaged points are imaged practically in diffraction-limited fashion. Once again, the correction of the longitudinal chromatic aberration is clearly identifiable.

For example, this wavefront manipulator is suitable for implementing focusing in a miniaturized camera—object distances from infinity to 62.5 mm are possible. This wavefront manipulator may then be combined with a fixed focal length objective at a fixed distance from the image sensor. The imaging quality is equally good for all object distances.

The third exemplary embodiment described hereinbelow relates to a CHL manipulator without refractive power, in which the position of the focus at a central wavelength remains virtually constant while the focal positions at the outer wavelengths shift. A CHL manipulator refers to a manipulator with which it is possible to set the longitudinal chromatic aberration variably. $\lambda_I=\lambda_F=486.1$ nm, $\lambda_{II}=\lambda_d=587.6$ nm, and $\lambda_{III}=\lambda_C=656.3$ nm are chosen as wavelengths. Schott glasses N-LASF44 and P-SF68 are selected as materials 1 and 2, respectively, of the optical elements 4 and 5; these glasses are characterized by the refractive indices $\eta_1(\lambda_d)=1.80420$ and $\eta_2(\lambda_d)=2.00520$, respectively, and by the Abbe numbers $\nu_1=46.50$ and $\nu_2=21.00$, respectively.

At the central wavelength $\lambda_d$, the refractive power of the wavefront manipulator is virtually independent of the displacement path α. For the two other wavelengths $\lambda_F$ and $\lambda_C$, the refractive power has an opposite sign and depends on the displacement path α. Thus, it is possible to displace the focal positions at the outer wavelengths against one another. Using such an optical unit, it is for example possible to correct the longitudinal chromatic aberration of a further optical unit (not shown in FIGS. 34, 37, 40, 43, and 46) which is situated between object point and the wavefront manipulator. Alternatively, the optical unit (not shown) may also be arranged between the wavefront manipulator 1 and the image point, or else completely replace the objective 21. It is also possible to attach the wavefront manipulator 1 in the center of the optical unit (not shown). This optical unit (not shown) may also be a zoom objective which, depending on the zoom setting, has a different longitudinal chromatic aberration that is compensated for by the wavefront manipulator.

Hereinbelow, the constant $\gamma_{1,2}$ for such a CHL manipulator is determined from equation $\Delta z_2(x,y)=\gamma_{1,2}\cdot\Delta z_1(x, y)+c_2$. To this end, equation (A-1) is used as a starting point again. For a CHL manipulator without refractive power at the wavelength $\lambda_d$, the wavefront deformation at a wavelength $\lambda_d$ can be written as $W_{\alpha,\lambda_d}(x, y)=f(\alpha)$ with any desired function $f(\alpha)$ which does not depend on the spatial coordinates x and y. This is the case if the optical path length l of an optical component according to equation (λ-1) is a constant c' for the wavelength $\lambda_d$, independently of the spatial coordinates (x, y), with the result that the following applies:

$$l(\lambda_d) = \Delta z_1(x, y)\cdot n_1(\lambda_d) + \Delta z_2(x, y)\cdot n_2(\lambda_d) + [d - \Delta z_1(x, y) - \Delta z_2(x, y)] = c' \Leftrightarrow \tag{C-1}$$

$$\Delta z_1(x, y)\cdot[n_1(\lambda_d) - 1] + \Delta z_2(x, y)\cdot[n_2(\lambda_d) - 1] = c' - d \tag{C-2}$$

Solving this equation for $\Delta z_2(x, y)$ yields:

$$\Delta z_2(x, y) = -\frac{n_1(\lambda_d) - 1}{n_2(\lambda_d) - 1}\cdot\Delta z_1(x, y) + \frac{c' - d}{n_2(\lambda_d) - 1} = -\frac{n_1(\lambda_d) - 1}{n_2(\lambda_d) - 1}\cdot\Delta z_1(x, y) + c_2, \tag{C-3}$$

where $c_2$ is once again an arbitrary constant. Thus, with the constant of proportionality $$\gamma_{1,2} = -\frac{n_1(\lambda_d) - 1}{n_2(\lambda_d) - 1},$$

a CHL manipulator which satisfies the equation $\Delta z_2(x,y)=\gamma_{1,2}\cdot\Delta z_1(x,y)+c_2$ is obtained. In this exemplary embodiment, Schott glasses N-LASF44 and P-SF68 with refractive indices $\eta_1(\lambda_d)=1.804200$ and $\eta_2(\lambda_d)=2.005200$, respectively, are chosen as first and second medium, respectively. The constant of proportionality $\gamma_{1,2}$ thus arises as $\gamma_{1,2}=-0.800$.

The length $\Delta z_1(x, y)$, which a straight line parallel to the z-axis runs through the first medium of N-LAF44 is defined in this exemplary embodiment as a power series $$\Delta z_1(x, y) = \sum_{m,n=0}^{5} c_{m,n}\cdot x^m\cdot y^n$$

with the following polynomial coefficients: $c_{0,0}=2$ mm, $c_{0,1}=-4.196718\text{e}{-02}$, $c_{2,1}=3.885850\text{e}{-04}$ $\text{mm}^{-2}$, $c_{0,3}=1.295283\text{e}{-04}$ $\text{mm}^{-2}$.

In this exemplary embodiment and with the choice of constant $c_2=2.100$ mm, the following arises for the length $\Delta z_2(x,y)$ of a straight line parallel to the z-axis through the medium of P-SF68:

$$\Delta z_2(x, y) = -0.800\cdot\Delta z_1(x, y) + 2.100 \text{ mm}.$$

The outer interfaces of the wavefront manipulator between air and the first optical element 4, consisting of the glass N-LASF44 in the present example, each are a plane surface. In the position with displacement path α=0 mm, the air thickness between the two plates of the wavefront manipulator is 1 mm. The displacement path a is in the range −8 mm<α<+8 mm. The air gap between the wavefront manipulator and the aperture is 0.14 mm. Hence, the geometric structure of the wavefront manipulator is described in full. The structure of the rotationally symmetric objective between aperture and image plane is described in table 1.

FIGS. 34, 37, 40, 43, and 46 show the structure of the optical device of the third exemplary embodiment. The front focal length is 250 mm in each case, independently of the displacement path a. The plotted light beams 11 correspond to light at a wavelength of $\lambda_d$; downstream of the wavefront manipulator, these light beams propagate approximately independently of the displacement path a. This behavior can also be gathered from the transverse aberrations of FIGS. 35, 36, 38, 39, 41, 42, 44, 45, 47, and 48. The transverse aberration curve 31 for $\lambda_d$ runs approximately along the abscissa and therefore shows that the image plane is always correctly focused for this wavelength, independently of the displacement path. By contrast, a different picture emerges for the outer wavelengths $\lambda_C$ and $\lambda_F$. The transverse aberrations 32 and 33 at these wavelengths are straight lines to a good approximation, the slopes of which depend on the displacement path $\alpha$ and have different signs. This transverse aberration at wavelengths $\lambda_C$ and $\lambda_F$ thus corresponds to defocusing which depends on the displacement path. Thus, this exemplary embodiment describes a CHL manipulator.

An important special case is obtained in the case of k=2 and $\gamma_{1,2}$=−1. In this case, the sum $\Delta z_1(x, y)+\Delta z_2(x, y)$ is a constant and independent of the spatial coordinates (x, y). As a result, it is possible for the surfaces of the optical components adjacent to air to be planar and the interface between the optical elements to be a free-form surface. This represents a cost advantage since only a single free-form surface is required in the manufacture of the optical element.

In the context of the wavefront manipulator, it is possible to use blank-pressed glasses or plastics as optical elements. These options are particularly cost-effective. To produce the optical components, one of the two media can be introduced into a mold first and the second medium can then be introduced into the mold in a machine for blank pressing or plastic injection molding and be used as a stamp.

It is possible to realize an apochromatic wavefront manipulator if two media with the same relative partial dispersion P are used for the at least two optical elements. Such equipment is characterized by the fact that an equation analogous to (A-2) is valid for a further wavelength. For example, the Schott glasses N-FK58 and N-BK7 have virtually identical relative partial dispersions of $P_{g,F}$=0.5347 and $P_{g,F}$=0.5349, respectively. It is therefore possible to use these two materials to realize a wavefront manipulator in which the wavefront deformation $W_{\alpha,\lambda}(x,y)$ has a virtually identical value for three wavelengths. Furthermore, an apochromatic wavefront manipulator for focusing is realizable if three media are used, with at least one medium having an anomalous partial dispersion.

TABLE 1

| Surface | Radius of curvature R [mm] | Thickness [mm] | Medium | Diameter [mm] | Asphere description |
|---|---|---|---|---|---|
| Aperture | ∞ | 1 | Air | 20 | |
| 1 | −69.719246 | 1 | N-BK7 | 24 | |
| 2 | 17.314636 | 9 | N-FK58 | 24 | Asphere, k = 0<br>A = −1.01115911E−04 $mm^{-3}$<br>B = 8.18700163E−08 $mm^{-5}$<br>C = −2.68704089E−10 $mm^{-7}$ |
| 3 | −26.568765 | 0.5 | Air | 24 | |
| 4 | 25.412712 | 9 | N-FK58 | 24 | |
| 5 | −28.305352 | 1 | N-SK5 | 24 | |
| 6 | 1357.504987 | 50 | Air | 24 | Asphere, k = 0<br>A = 1.425598656−05 $mm^{-3}$<br>B = 2.55155887E−10 $mm^{-5}$<br>C = 0 $mm^{-7}$ |
| Image | ∞ | | | | |

TABLE 2

| Surface | Radius of curvature R [mm] | Thickness [mm] | Medium | Diameter [mm] | Asphere description |
|---|---|---|---|---|---|
| Aperture | ∞ | 1 | Air | 10 | |
| 1 | −34.859623 | 0.5 | N-BK7 | 12 | |
| 2 | 8.657318 | 4.5 | N-FK58 | 12 | Asphere, k = 0<br>A = −8.08927285E−04 $mm^{-3}$<br>B = 2.61984052−06 $mm^{-5}$<br>C = −3.43941233E−08 $mm^{-7}$ |
| 3 | −13.284382 | 0.25 | Air | 12 | |
| 4 | 12.706356 | 4.5 | N-FK58 | 12 | |
| 5 | −14.152676 | 0.5 | N-SK5 | 12 | |
| 6 | 678.752494 | 25 | Air | 12 | Asphere, k = 0<br>A = 1.14047885E−04 $mm^{-3}$<br>B = 8.16498839E−09 $mm^{-5}$<br>C = 0 $mm^{-7}$ |
| Image | ∞ | | | | |

LIST OF REFERENCE SIGNS

1 Wavefront manipulator
2 First optical component
3 Second optical component
4 First optical element
Further optical element
6 Contact face
7 Plane outer surface
8 Center axis
9 Reference axis
10 Aperture
11 Light beams
12 Focus
13 Outer surface
30 Optical device
21 Rotationally symmetric objective
22 Cemented element
23 Cemented element
31 Transverse aberration for a wavelength of 587.6 nm
32 Transverse aberration for a wavelength of 656 nm
33 Transverse aberration for a wavelength of 486.1 nm

The invention claimed is:

1. A wavefront manipulator, comprising:

a first optical component; and a second optical component, wherein the first optical component and the second optical component are arranged in succession along a reference axis, with the first optical component and the second optical component being arranged so as to be movable relative to one another perpendicular to the reference axis, and wherein the first optical component and the second optical component each comprise a first optical element and at least one further optical element with differing refractive index profiles $n_1(\lambda)$ and $n_i(\lambda)$ arranged in succession along the reference axis, with the optical elements having, in relation to local coordinates x and y of the optical components, a spatially dependent length $\Delta z_i(x, y)$ in a z-direction parallel to the reference axis, where the index i denotes the optical element.

2. The wavefront manipulator of claim 1, wherein the spatially dependent length of the at least one further optical element $\Delta z_i(x,y)$ is not constant and depends linearly on the spatially dependent length of the first optical element.

3. The wavefront manipulator of claim 1, wherein it is true for each of the first and second optical components that, in at least 80 percent of all volumes $V_a$ of the respective optical component with the points (x, y, z) which are irradiated for a specific displacement path a, the following holds true for all materials i with arbitrary constants $\gamma_{1,i}$ and $c_i$:

$$\left|\frac{\Delta z_i(x, y) - \gamma_{1,i} \cdot \Delta z_1(x, y) - c_i}{\gamma_{1,i} \cdot \Delta z_1(x, y) + c_i}\right| < 0.25.$$

4. The wavefront manipulator of claim 1, wherein it is true for each of the first and second optical components that, in at least 90 percent of all volumes $V_a$ of the respective optical component with the points (x, y, z) which are irradiated for a specific displacement path a, the following holds true for all materials i with arbitrary constants $\gamma_{1,i}$ and $c_i$:

$$\left|\frac{\Delta z_i(x, y) - \gamma_{1,i} \cdot \Delta z_1(x, y) - c_i}{\gamma_{1,i} \cdot \Delta z_1(x, y) + c_i}\right| < 0.10.$$

5. The wavefront manipulator of claim 1, wherein it is true for each of the first and second optical components that, in at least 97 percent of all volumes $V_a$ of the respective optical component with the points (x, y, z) which are irradiated for a specific displacement path a, the following holds true for all materials i with arbitrary constants $\gamma_{1,i}$ and $c_i$:

$$\left|\frac{\Delta z_i(x, y) - \gamma_{1,i} \cdot \Delta z_1(x, y) - c_i}{\gamma_{1,i} \cdot \Delta z_1(x, y) + c_i}\right| < 0.01.$$

6. The wavefront manipulator of claim 1, wherein the first and second optical components have identical optical funcitonalities.

7. The wavefront manipulator of claim 1, wherein at least one of the first and second optical components has at least one plane outer surface which extends perpendicular to the reference axis.

8. The wavefront manipulator of claim 1, wherein the first and second optical components are arranged so as to be movable relative to one another by translation in at least one direction perpendicular to the reference axis and/or by rotation about an axis running parallel to the reference axis.

9. The wavefront manipulator of claim 1, wherein at least one of the first and second optical components comprises at least two optical elements which have relative partial dispersions that differ from one another by less than a specified limit value of 0.01.

10. The wavefront manipulator of claim 1, wherein at least one of the first and second optical components comprises at least three optical elements, wherein at least one of the at least three optical elements has an anomalous relative partial dispersion, wherein a material with an Abbe number of $v_d$ has an anomalous relative partial dispersion if the absolute value of a difference $$\Delta P_{g,F} = P_{g,F} - P_{g,F}^{normal}$$

between the relative partial dispersion $P_{g,F}$ of the material and a normal relative partial dispersion $$P_{g,F}^{normal}$$

at the Abbe number $v_d$ of the material is at least 0.005.

11. The wavefront manipulator of claim 1, wherein at least one of the first and second optical components comprises at least two optical elements, and wherein the at least two optical elements are arranged immediately in succession and have a common contact face in the form of a free-form surface.

12. An optical device, comprising the wavefront manipulator of claim 1.

13. A method of using at least one wavefront manipulator, comprising bringing about an adjustable change of a wavefront and/or causing at least one from the group of the following corrections or reductions: astigmatism, coma, dichromatic correction, trichromatic correction, reduction of the secondary spectrum, reduction of the tertiary spectrum, via the wavefront manipulator of claim 1.

14. A method of use of a wavefront manipulator, comprising bringing about a position-dependent correction of at least one wavefront error in a zoom objective via the wavefront manipulator of claim 1.

* * * * *